(12) United States Patent
Kondo et al.

(10) Patent No.: US 7,681,221 B2
(45) Date of Patent: *Mar. 16, 2010

(54) CONTENT PROCESSING APPARATUS AND CONTENT PROCESSING METHOD FOR DIGEST INFORMATION BASED ON INPUT OF CONTENT USER

(75) Inventors: Tetsujiro Kondo, Tokyo (JP); Naoki Kobayashi, Tokyo (JP); Tsutomu Ichikawa, Kanagawa (JP); Yukihiro Nakamura, Chiba (JP); Yoshinori Watanabe, Kanagawa (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 249 days.

This patent is subject to a terminal disclaimer.

(21) Appl. No.: 11/595,428

(22) Filed: Nov. 10, 2006

(65) Prior Publication Data
US 2007/0061853 A1    Mar. 15, 2007

Related U.S. Application Data

(63) Continuation of application No. 11/439,406, filed on May 22, 2006, which is a continuation of application No. 09/988,421, filed on Nov. 16, 2001, now Pat. No. 7,127,736.

(30) Foreign Application Priority Data

Nov. 17, 2000    (JP) ............................. 2000-350617

(51) Int. Cl.
*H04N 7/173* (2006.01)

(52) U.S. Cl. .................... 725/93; 725/91; 725/114; 725/116; 725/146; 348/561
(58) Field of Classification Search .................. 725/93, 725/116, 146; 348/561
See application file for complete search history.

(56) References Cited

U.S. PATENT DOCUMENTS

| 5,623,344 | A | 4/1997 | Lane et al. |
| 5,818,439 | A | 10/1998 | Nagasaka et al. |
| 5,974,218 | A | 10/1999 | Nagasaka et al. |

(Continued)

OTHER PUBLICATIONS

"Buffer." Microsoft Press Computer Dictionary. 3rd ed. 1997.*

(Continued)

*Primary Examiner*—Christopher Kelley
*Assistant Examiner*—Farzana Hossain
(74) *Attorney, Agent, or Firm*—Frommer Lawrence & Haug LLP; William S. Frommer; Thomas F. Presson

(57) ABSTRACT

Value-added information is created based on favorite information of a content user. The content is processed according to the generated value-added information. Favorite data indicating operations, such as fast-forward, pause, and rewind operations, performed while the content is being played back, and personal user information, such as the age group, the gender, and the life-style, of the content user are transferred to a server via a network. The server performs statistical processing on the user favorite data to generate value-added information according to the attributes of the user, such as the age group, the gender, and the life-style. Accordingly, the user is able to search for popular titles, play back only popular scenes, and skip uninteresting scenes by using a content playback apparatus.

38 Claims, 27 Drawing Sheets

U.S. PATENT DOCUMENTS

| | | |
|---|---|---|
| 6,236,395 B1 | 5/2001 | Sezan et al. |
| 6,314,568 B1 | 11/2001 | Ochiai et al. |
| 6,757,482 B1 | 6/2004 | Ochiai et al. |
| 6,870,573 B2 | 3/2005 | Yeo et al. |
| 2002/0178450 A1* | 11/2002 | Morita et al. ............. 725/61 |
| 2003/0088873 A1* | 5/2003 | McCoy et al. ............. 725/63 |
| 2005/0028208 A1 | 2/2005 | Ellis et al. |
| 2005/0108758 A1 | 5/2005 | Jun |
| 2005/0160457 A1 | 7/2005 | Rui et al. |

OTHER PUBLICATIONS

"Central Processing Unit." Microsoft Press Computer Dictionary. 3rd ed. 1997.*

* cited by examiner

| | DISTRIBUTION (BROADCAST) TIME | NUMBER OF INSTRUCTIONS |
|---|---|---|
| CANDIDATE 1 | SCENE SPECIFIC INFORMATION | EVALUATION VALUE |
| CANDIDATE 2 | SCENE SPECIFIC INFORMATION | EVALUATION VALUE |
| CANDIDATE 3 | SCENE SPECIFIC INFORMATION | EVALUATION VALUE |
| ⋮ | ⋮ | ⋮ |
| CANDIDATE N | SCENE SPECIFIC INFORMATION | EVALUATION VALUE |

CONTENT PROCESSING APPARATUS AND CONTENT PROCESSING METHOD FOR DIGEST INFORMATION BASED ON INPUT OF CONTENT USER

This application is a Continuation of U.S. application Ser. No. 11/439,406, filed May 22, 2006, which is a Continuation of U.S. application Ser. No. 09/988,421, filed Nov. 16, 2001, now U.S. Pat. No. 7,127,736, which is entitled to a claim of priority to Japanese Application 2000-350617, filed in Japan on Nov. 17, 2000, the entirety of which is hereby incorporated by reference.

BACKGROUND OF THE INVENTION

1. Field of the Invention

The present invention generally relates to a content processing apparatus and a content processing method for processing content to be distributed or delivered via various distributing/delivering means, and also to a storage medium implementing such a method. More particularly, the invention pertains to a content processing apparatus and a content processing method for processing value-added information for the content, and also to a storage medium implementing such a method. More specifically, the invention relates to a content processing apparatus and a content processing method for processing content digest information obtained from favorite information of a content user or instruction information for playing back the content, and also to a storage medium implementing such a method. More particularly, the invention relates to a content processing apparatus and a content processing method for processing the content according to the content digest information, and also to a storage medium implementing such a method.

2. Description of the Related Art

Various types of content, such as movies, dramas, sport programs, music, etc., are now distributed or delivered to many unspecified viewers/listeners (users) via various distributing/delivering means, such as distributing via broadcast or communication, and delivering via media, for example, digital versatile discs (DVDs) on which the content is stored.

In this type of content distributing/delivering technique, the content is simply distributed/delivered from a content provider, and the user favorite information is not added to the content. For example, when playing back the content with a playback apparatus, the user may find a popular title, an interesting scene, and an uninteresting scene in the content. The user expresses his/her favorite in response to such various scenes by performing an operation on the playback apparatus, for example, changing channels, fast-forwarding the content, or rewinding the content.

The favorite data obtained by the above-described user operation is very useful in selecting the content from an enormous number of items of content, and has predetermined added value. The user favorite data can also be used for classifying and digesting the content, such as selecting a specific title or a specific scene from the title and storing it (or recording an index of the selected scenes).

At present, however, a system for feeding back such an added value obtained from the user favorite information to the user, or a system for utilizing the added value for viewing/listening to the content is not provided.

SUMMARY OF THE INVENTION

Accordingly, it is an object of the present invention to provide a content processing apparatus and a content processing method for processing content digest information for providing an added value, and also to a storage medium implementing such a method.

It is another object of the present invention to provide a content processing apparatus and a content processing method for processing content digest information obtained from user favorite information and content instruction information, and also to a storage medium implementing such a method.

It is still another object of the present invention to provide a content processing apparatus and a content processing method for processing the content according to content digest information, and also to a storage medium implementing such a method.

In order to achieve the above objects, according to one aspect of the present invention, there is provided a communication apparatus including a receiver for receiving operation data obtained by each user for dynamic data played back by a playback apparatus. A storage unit stores the operation data received by the receiver. A digest-information generator generates digest information of the dynamic data according to the operation data stored in the storage unit. A transmitter transmits the digest information generated by the digest-information generator to at least one of the playback apparatuses.

In the aforementioned communication apparatus, the receiver may receive the operation data indicating at least one of instructions to fast-forward, rewind, and pause the dynamic data played back by the playback apparatus.

The receiver may receive playback-portion identification information indicating a playback portion of the dynamic data played back by the playback apparatus. The digest-information generator may include a statistical processor for accumulating playback times of the playback portion based on the playback-portion identification information received by the receiver, in which case, the digest-information generator generates the digest information based on an accumulation result obtained by the statistical processor.

The digest-information generator may generate the digest information from the playback portion whose accumulated playback times indicate a predetermined threshold or greater.

The digest-information generator may generate the digest information from the portions other than the playback portion whose accumulated playback times indicate a predetermined threshold or smaller.

The receiver may receive, together with the operation data, at least one of title information, playback time information, and user attribute information of the dynamic data played back by the playback apparatus.

The storage unit may store the operation data of a plurality of users corresponding to the title information. The statistical processor may accumulate the playback times of the playback portion according to the title information based on the operation data of the plurality of users. The digest-information generator may generate the digest information based on the accumulation result. The transmitter may transmit the digest information to the playback apparatus for playing back the title information.

The user attribute information may include at least one type of the age, the gender, and the life-style, in which case, the digest-information generator may generate the digest information according to the type of the user attribute information.

The receiver may receive as the operation data time-space position data designating a time-space position of the dynamic data played back by the playback apparatus.

The storage unit may store a plurality of the dynamic data. The transmitter may encode the dynamic data and transmit the encoded dynamic data to the playback apparatus in response to a request from the user, in which case, the transmitter may encode a target area designated by the time-space position data at a first resolution level, and may encode areas other than the target area at a second resolution level which is lower than the first resolution level.

The transmitter may transmit predetermined dynamic data to the playback apparatus in response to a request from the user. The receiver may receive the operation data obtained by each user for the dynamic data transmitted by the transmitter. The digest-information generator may generate the digest information of the dynamic data according to the operation data. The transmitter may transmit the generated digest information to the corresponding playback apparatus in response to a request from the user.

The transmitter may include a broadcast unit for broadcasting the dynamic data to the playback apparatuses of unspecified users.

The receiver may receive as the operation data time-space position data designating a time-space position of the dynamic data transmitted by the transmitter and played back by the playback apparatus.

The transmitter may encode the dynamic data and transmit the encoded dynamic data to the playback apparatus in response to a request from the user, in which case, the transmitter may encode a target area designated by the time-space position data at a first resolution level, and encode areas other than the target area at a second resolution level which is lower than the first resolution level, and may transmit the encoded dynamic data.

The digest-information generator may include a statistical processor for accumulating designation times of each of the time-space positions based on the time-space position data of the identical dynamic data received from a plurality of users by the receiver, and may generate the digest information based on an accumulation result obtained by the statistical processor.

The digest-information generator may dynamically sort the accumulation results of scenes designated by the time-space position data obtained by the statistical processor in descending numeric order, and may extract a predetermined number of scenes having a greater number of the accumulated designation times according to a sorting result, thereby dynamically generating the digest information.

The transmitter may include a broadcast unit for broadcasting the dynamic data to the playback apparatuses of unspecified users. When the receiver receives request information to send the digest information from the playback apparatus while the dynamic data is being broadcast, the digest-information generator may generate the digest information during a period from when the dynamic data is started until when the digest information is transmitted. The transmitter may transmit the digest information to the playback apparatus.

When the receiver receives request information to send the digest information from a specific playback apparatus, the digest-information generator may compare the digest information generated based on the sorting result with the scenes designated by the time-space position data of the user of the specific playback apparatus, and may preferentially select the scenes unique to the time-space position data of the user, thereby generating new digest information for the user.

The transmitter may transmit the digest information to the playback apparatus of the user, and may also transmit accounting information including payment information for billing the user to an external settlement center.

According to another aspect of the present invention, there is provided a communication apparatus including a playback unit for playing back dynamic data. An input unit inputs as input data user favorite data for the dynamic data played back by the playback unit. A transmitter transmits the input data input by the input unit to an external communication apparatus. A receiver receives digest information of the dynamic data transmitted from the external communication apparatus.

In the aforementioned aspect of the communication apparatus, the input unit may output the input data indicating at least one of instructions to fast-forward, rewind, and pause the dynamic data played back by the playback unit.

The transmitter may transmit playback-portion identification information indicating a playback portion of the dynamic data played back by the playback unit.

The transmitter may transmit, together with the input data, at least one of title information, playback time information, and user attribute information of the dynamic data played back by the playback unit.

The input unit may output as the input data time-space position data designating a time-space position of the dynamic data played back by the playback unit. The transmitter may transmit the time-space position data.

The transmitter may transmit request information to send predetermined dynamic data to the external communication apparatus. The receiver may receive the dynamic data transmitted from the external communication apparatus in response to the request information. The playback unit may play back the received dynamic data.

The receiver may include a broadcast receiver for receiving the dynamic data to be broadcast to the playback unit of unspecified users.

The transmitter may transmit as the input data time-space position data designating a time-space position of the dynamic data received by the receiving unit and played back by the playback unit.

The transmitter may transmit the request information to send the digest information during a period from the start of the dynamic data until a current time while the dynamic data is being played back by the playback unit.

According to still another aspect of the present invention, there is provided a communication apparatus including a receiver for receiving dynamic data from an external source. A playback unit plays back the dynamic data received by the receiver. An input unit inputs as input data user favorite data for the dynamic data played back by the playback unit. A digest-information generator generates digest information based on the input data input by the input unit. A transmitter transmits the digest information generated by the digest-information generator to a portable terminal.

In the aforementioned aspect of the communication apparatus, the input unit may output input data indicating at least one of instructions to fast-forward, rewind, and pause the dynamic data played back by the playback unit.

The input unit may output as the input data playback-portion identification information indicating a playback portion of the dynamic data played back by the playback unit. A digest-information generator may include a statistical processor for accumulating playback times of the playback portion based on the playback-portion identification information, in which case, the digest-information generator generates the digest information based on an accumulation result obtained by the statistical processor.

The digest-information generator may generate the digest information from the playback portion whose accumulated playback times indicate a predetermined threshold or greater.

The digest-information generator may generate the digest information from portions other than the playback portion whose accumulated playback times indicate a predetermined threshold or smaller.

The input unit may output as the input data at least one of title information, playback time information, and user attribute information of the dynamic data played back by the playback unit.

The aforementioned aspect of the communication apparatus may further include a storage unit for storing the operation data of a plurality of users corresponding to the title information. In this case, the statistical processor may accumulate the playback times of each of the playback portions according to the title information based on the operation data of the plurality of users, and the digest-information generator may generate the digest information based on the accumulation result.

The user attribute information may include at least one type of the age, the gender, and the life-style, in which case, the digest-information generator may generate the digest information according to the type of the user attribute information.

The input unit may output as the input data time-space position data designating a time-space position of the dynamic data played back the playback unit.

The transmitter may transmit request information to send predetermined dynamic data to an external communication apparatus. The receiver may receive the dynamic data transmitted from the external communication apparatus in response to the request information. The digest-information generator may generate the digest information of the dynamic data.

The receiver may include a broadcast receiver for receiving the dynamic data to be broadcast to the playback unit of unspecified users.

The input unit may output as the input data time-space position data designating a time-space position of the dynamic data received by the broadcast receiver and played back by the playback unit.

The digest-information generator may include a statistical processor for accumulating designation times of each of the time-space positions based on the time-space position data of the identical dynamic data input by the input unit, in which case, the digest-information generator may generate the digest information based on an accumulation result obtained by the statistical processor.

The digest-information generator may dynamically sort the accumulation results of scenes designated by the time-space position data obtained by the statistical processor in descending numeric order, and may extract a predetermined number of scenes having a greater number of the accumulated designation times according to a sorting result, thereby dynamically generating the digest information.

When the input unit outputs request information to send the digest information from the playback unit while the dynamic data is being broadcast, the digest-information generator may generate the digest information during a period from when the dynamic data is started until when the digest information is transmitted.

When the input unit outputs request information to send the digest information from a specific user, the digest-information generator may compare the digest information generated based on the sorting result with the scenes designated by the time-space position data of the specific user, and may preferentially select the scenes unique to the time-space position data of the specific user, thereby generating new digest information for the specific user.

The transmitter may preferentially transmit the digest information to the portable terminal according to the level of priority or the level of urgency of the digest information.

The digest-information generator may generate the digest information in a hierarchical structure consisting of layers having different sizes of the digest information, in which case, a lower layer of the hierarchical structure may have a greater size of the digest information, and a higher layer of the hierarchical structure may have a smaller size of the digest information.

The digest-information generator may selectively transmit the digest information of the individual levels of the hierarchical structure according to a traffic of a communication channel between the communication apparatus and the portable terminal.

The playback unit may include a display unit for displaying moving picture data, which serves as the dynamic data or the digest information.

According to a further aspect of the present invention, there is provided a communication method including the steps of: receiving operation data obtained by each user for dynamic data played back by a playback apparatus; generating digest information of the dynamic data according to the received operation data; and transmitting the generated digest information to at least one of the playback apparatuses.

According to a yet further aspect of the present invention, there is provided a communication method including the steps of: playing back dynamic data; inputting as input data user favorite data for the played back dynamic data; transmitting the input data to an external communication apparatus; and receiving digest information of the dynamic data transmitted from the external communication apparatus.

According to a further aspect of the present invention, there is provided a communication method including: receiving dynamic data from an external source; playing back the received dynamic data; inputting as input data user favorite data for the played back dynamic data; generating digest information based on the input data; and transmitting the generated digest information to a portable terminal.

According to a further aspect of the present invention, there is provided a storage medium for storing a program implementing a communication method. The communication method includes the steps of: receiving operation data obtained by each user for dynamic data played back by a playback apparatus; generating digest information of the dynamic data according to the received operation data; and transmitting the generated digest information to at least one of the playback apparatuses.

According to a further aspect of the present invention, there is provided a storage medium for storing a program implementing a communication method. The communication method includes the steps of: playing back dynamic data; inputting as input data user favorite data for the played back dynamic data; transmitting the input data to an external communication apparatus; and receiving digest information of the dynamic data transmitted from the external communication apparatus.

According to a further aspect of the present invention, there is provided a storage medium for storing a program implementing a communication method. The communication method includes the steps of: receiving dynamic data from an external source; playing back the received dynamic data; inputting as input data user favorite data for the played back dynamic data; generating digest information based on the input data; and transmitting the generated digest information to a portable terminal.

The above-described storage media provide computer programs to general-purpose computer systems which execute various program codes. Such media include detachable and portable storage media, for example, compact discs (CD), floppy disks (FD), magneto-optical disks (MO), etc. It is also technically possible to provide the computer programs to a specific computer system via a transmission medium, such as a network (may be a wireless or cable network).

In the above-described storage media, structural or functional cooperative relationships between a predetermined computer program and the storage medium for implementing the functions of the computer program in a computer system are defined. In other words, by installing a predetermined computer program into a computer system via one of the above-described storage media of the present invention, the cooperative action can be exerted on the computer system. In this case, advantages similar to those offered by the communication apparatuses or the communication methods of the present invention can be obtained.

According to the above-described communication apparatuses, the communication methods, and the storage media of the present invention, it is possible to obtain user operation information, such as fast-forward, pause, and rewind operations, performed when the content, such as video or music, stored in a medium, such as a DVD, is played back in a predetermined content playback apparatus. Then, the operation information of a plurality of users is centrally processed by a predetermined server so as to generate value-added information including, for example, popular titles, interesting scenes, and uninteresting scenes. The value-added information can be distributed to the users, in which case, it may be charged to the user. Upon receiving the value-added information, the user is able to search for popular titles, play back only the interesting scenes, or skip the uninteresting scenes by using the content playback apparatus. In this case, the value-added information can be created while being transparent to the user.

In addition to the user operation information, personal user information and the playback-time-zone information can also be sent to the server. In this case, the server is able to generate value-added information according to the type of user attributes, such as the age group, the gender, and the life-style. Thus, it is possible to provide the value-added information suitable for the user requesting the value-added information. The user is thus able to select the content playback technique suitable for the user.

According to the present invention, when the content of a time-based event (for example, a movie, a drama, or a sport program) is distributed or played back, predetermined statistical processing is performed by centrally processing instruction information for temporally or spatially specifying favorite scenes by a predetermined server. Accordingly, digest scenes consisting of scenes that the user wishes to view can automatically be created. The digest scenes can be dynamically updated by continuously receiving the instruction information. For example, for the viewers who have started to watch an event halfway through, a digest scene indicating the past progress of the event can be provided, which can be a guide for the users. The created digest scenes may be charged to the users.

Additionally, according to the present invention, by performing the statistical processing as discussed above, an averaged digest reflecting the favorites of many users can be created. The created averaged digest can be charged to the users.

The favorite information of a specific user has portions which overlap with the averaged digest and portions which do not overlap therewith. Thus, a personal digest can be created by emphasizing the portions unique to the favorite information of the specific user, which reflects the difference of the favorites between the user and the other users. The personal digest can also be charged to the users.

According to the present invention, upon receiving the content of a time-based event, a content receiving apparatus is able to not only play back the content, but also digest the content, and distribute the content digest to a small portable receiving terminal, such as a personal digital assistant (PDA). As a result, the portable receiving terminal is able to play back the content digest under a mobile environment without a content receiving function or a content digesting function.

When sending the content or the content digest from the content receiving apparatus to a portable receiving terminal, information indicating the priority or the urgency of the content can be added. Accordingly, the content or the digest having a high level of priority or urgency can automatically be sent to the receiving terminal. Also, a digest can be formed into a hierarchical structure consisting of layers having different amount of information. Then, the digest of a suitable level of the hierarchical structure can efficiently be transmitted according to the traffic between the receiving apparatus and the receiving terminal, the communication time, or the storage capacity of the receiving terminal.

Further objects, features and advantages of the present invention will become apparent from the following description of the preferred embodiments with reference to the attached drawings.

DESCRIPTION OF THE PREFERRED EMBODIMENTS

The present invention is described in detail below with reference to the drawings through illustration of preferred embodiments.

Figure 1:
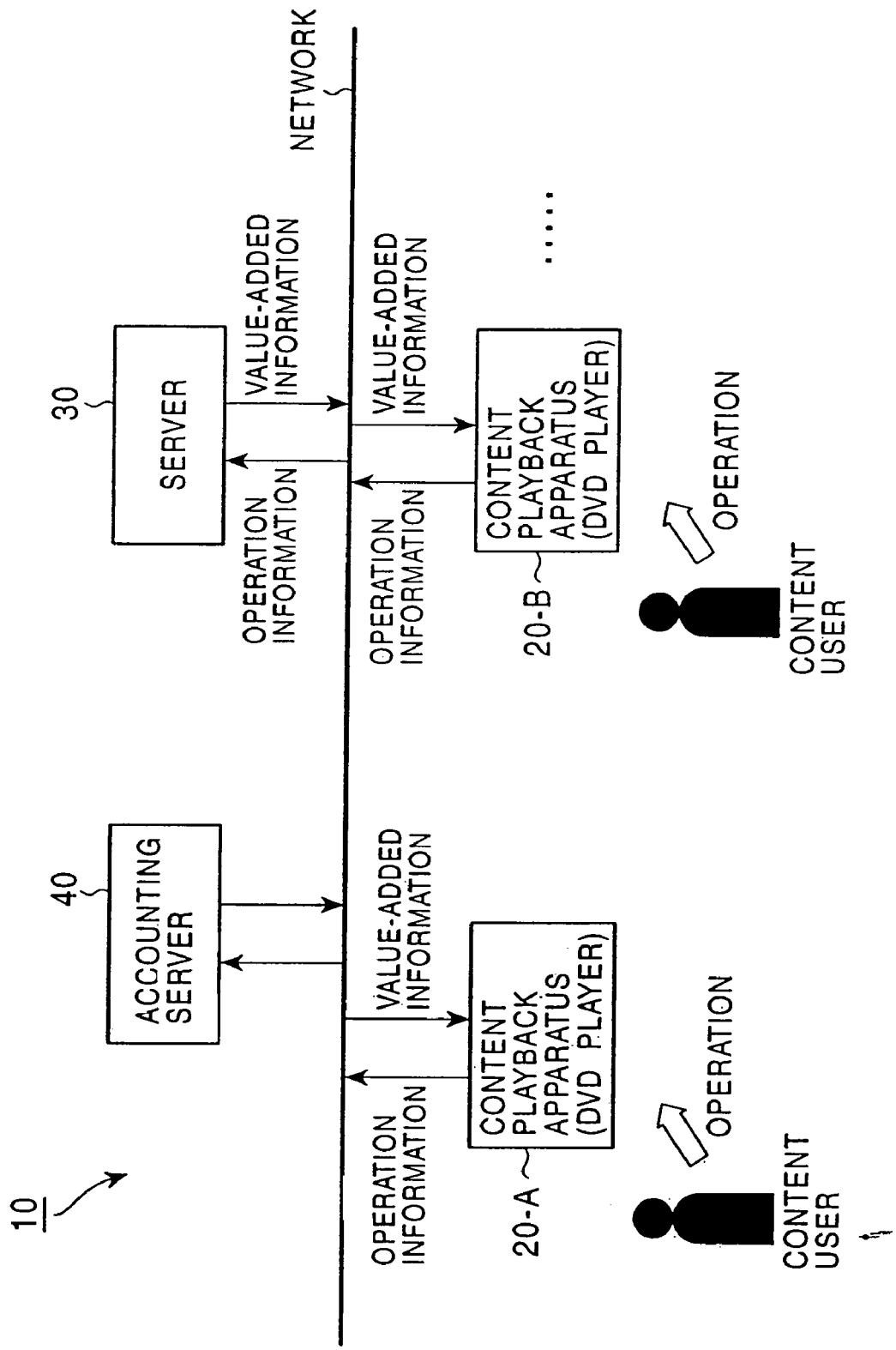
FIG. 1 is a schematic diagram illustrating the configuration of a network system 10 according to an embodiment of the present invention.

FIG. 1 schematically illustrates the configuration of a network system 10 according to an embodiment of the present invention. The network system 10 is formed of, as shown in FIG. 1, content playback apparatuses 20A, 20B, and so on (hereinafter simply referred to the "playback apparatus 20" unless it is necessary to distinguish them individually), for playing back the content stored in a medium, such as a DVD, a server 30 for generating content digest information based on user favorite data obtained from the user of the content playback apparatus 20, i.e., the content viewer/listener, and an accounting server 40 for performing accounting processing for the distribution or delivering of the digest information.

In this embodiment, the user favorite data is formed of information of the operations performed by the user while playing back the content (for example, the operation history, such as fast-forward, pause, rewind, etc., on the content playback apparatus 20). The user favorite data, and personal user information, such as the age group, the gender, and the life-style, are transferred to the server 30 via a network.

The server 30 then applies predetermined computation processing to the user favorite data so as to generate value-added information as the content digest information according to the user attributes, such as the age group, the gender, and the life-style. The value-added information is distributed to the individual content playback apparatuses 20A, 20B, and so on, i.e., to the content users (viewers and listeners). In this case, the user may be charged for the content and the value-added information, or the user may receive them free.

Figure 2:
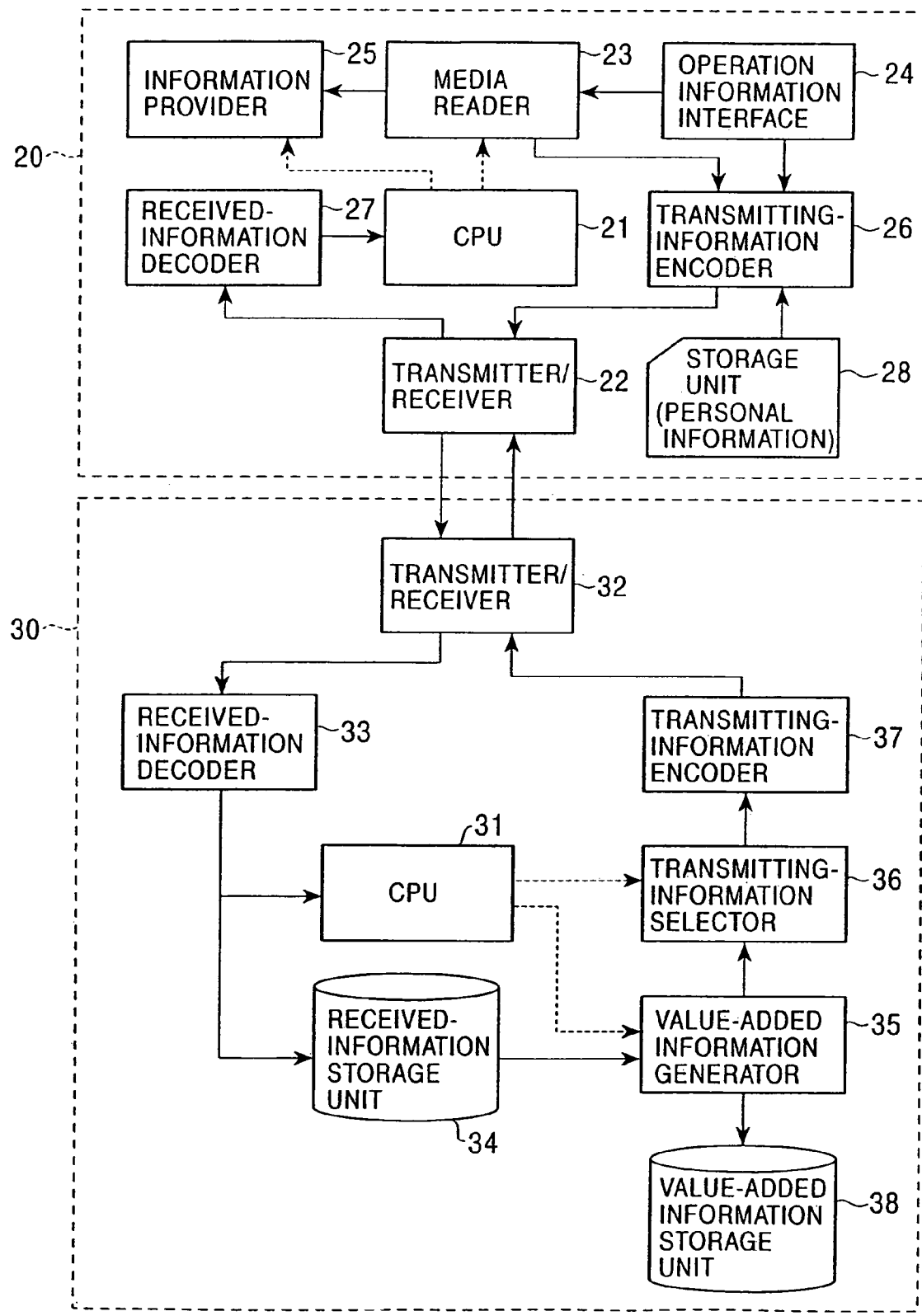
FIG. 2 is a block diagram illustrating the functional configuration of a content playback apparatus 20 and a server 30 shown in FIG. 1.

FIG. 2 is a block diagram illustrating the functional configuration of the content playback apparatus 20 as a client, and the server 30.

The content playback apparatus 20 includes, as shown in FIG. 2, a central processing unit (CPU) 21, a transmitter/receiver 22, a media reader 23, an operation information interface 24, an information provider 25, a transmitting-information encoder 26, a received-information decoder 27, and a storage unit 28. Under the overall control of the CPU 21, the content playback apparatus 20 plays back the content, and performs the accompanying processing operation, for example, playing back the value-added information.

The media reader 23 accesses the recording surface of a medium loaded in a media accommodating portion, such as a tray, to read the content, and supplies it to the information provider 25.

The information provider 25, which is formed of an image output device, such as a display device, and an audio output device, such as a speaker, plays back (output) the content read by the media reader 23.

The content reading operation by the media reader 23 and the output operation by the information provider 25 are basically performed in response to a user operation performed via the operation information interface 24. The operation information interface 24 includes operation buttons, such as play, stop, fast-forward, and rewind buttons.

The user operation information input by the user via the operation information interface 24 forms the user favorite data of the content played back by the user. The user operation information is output to the transmitting-information encoder 26 as material data for generating the content digest information. The transmitting-information encoder 26 performs a predetermined encoding operation on part of the transmitting information, and more specifically, on title information of the content read by the media reader 23, personal user information read from the storage unit 28, playback-time-zone information indicating in which time zone the content is played back on the information provider 25, and so on. The encoded transmitting information is sent from the transmitter/receiver 22 to the server 30 via a network.

The server 30 analyzes the content title information, the user operation information, i.e., the user favorite data, the personal user information, the playback-time-zone information, etc., contained in the transmitting information, so as to generate value-added information as the content digest information. This will be discussed in detail below. The value-added information includes popular title information, popular scene information, uninteresting scene information, etc., which will also be described below. The value-added information may be formed of a corresponding frame in the content, or may be index information of the corresponding frame. The value-added information is sent to the content playback apparatus 20. The accounting server 40 bills an information usage fee to the user of the content playback apparatus 20 when providing the value-added information.

In the content playback apparatus 20, the value-added information is received by the transmitter/receiver 22, and the received information decoder 27 performs a predetermined decoding operation on the received value-added information. Additionally, the popular title information, the popular scene information, the interesting scene information, the uninteresting scene information, etc., are extracted from the value-added information, and are supplied to the CPU 21.

The CPU 21 is able to control the content playback operation performed by the media reader 23 and the information provider 25 based on the value-added information. More specifically, various value-added playback services, such as searching popular titles, playing back only popular scenes (digest), skipping uninteresting scenes, etc., can be provided.

In FIG. 2, only one content playback apparatus 20 is shown. In practice, however, many content playback apparatuses 20 are connected to the server 30, and the user operation information, the content title information, the personal user information, the playback-time-zone information, etc., are transmitted from each playback apparatus 20, and are stored in the server 30.

The server 30 is formed of a CPU 31, a transmitter/receiver 32, a received-information decoder 33, a received-information storage unit 34, a value-added information generator 35, a transmitting-information selector 36, a transmitting-information encoder 37, and a value-added information storage unit 38. Under the control of the CPU 31, the server 30 stores and computes the received information from the content playback apparatus 20, such as the user operation information, and also creates the content digest information by performing statistical processing and then distributes it.

The user operation information, i.e., the user favorite data, the content title information, the personal user information, the playback-time-zone information, etc., sequentially received by the transmitter/receiver 32, are subjected to predetermined decoding processing in the received-information decoder 33, and are then stored in the received-information storage unit 34.

The value-added information generator 35 reads the user operation information, i.e., the user favorite data, the content title information, the personal user information, the playback-time-zone information, etc., from the received information storage unit 34, and performs statistical processing on such information, thereby generating the value-added information as the content digest information. The generated value-added information is sequentially stored in the value-added information storage unit 38. The value-added information may be formed of a corresponding frame in the content, or may be index information of the corresponding frame.

The transmitting-information selector 36 selects the value-added information to be sent to each client, and delivers it to the transmitting-information encoder 37. The transmitting-information encoder 37 encodes the selected value-added information, and outputs it to the transmitter/receiver 32.

The transmitter/receiver 32 distributes the value-added information to a specific client, i.e., a specific content playback apparatus 20. In this case, only the clients which have paid or confirmed to pay for the usage of the value-added information can receive the value-added information. Accordingly, the server 30 may charge for the value-added information or for the services for playing back the value-added information. When the value-added information is sent, the accounting server 40 may bill an information usage fee different from the content usage fee which is billed when the content is sent.

As stated above, the value-added information includes, for example, popular title information, popular scene information, and uninteresting scene information (or index information for specifying these scenes). These items of information are created based on the information concerning the age, the gender, and the playback time zone contained in the personal user information according to the age group (for example, teenagers, twenties, or thirties), the gender, the life-style (for example, office worker type: mainly viewing/listening to the content in the evening; housewife type: mainly viewing/listening to the content in the daytime; and student type: mainly viewing/listening to the content from midnight to early morning). It is necessary, however, to assume that users leading similar life-styles are interested in the same type of favorite content.

The popular title information is created based on stored information of the content titles sent from the individual content playback apparatuses (for example, the title attached to a medium, such as a DVD, which is currently loaded in a media tray of the content playback apparatus). The popular title information may include a popular title ranking which indicates the frequently viewed/listened titles.

The popular scene information is created based on the stored data of the content title information and the user operation information sent from the individual content playback apparatuses. The popular scene information is generated by accumulatively adding popular points to the scenes which are frequency played back. A greater weight may be applied to the scenes which are repeatedly played back by fast-forwarding or rewinding.

The uninteresting scene information is created based on the stored data of the content title information and the user operation information sent from the individual content playback apparatuses. The uninteresting scene information is generated by accumulatively adding uninteresting points to the scenes which are less frequently played back.

The content playback apparatus 20 is able to receive the value-added information from the server 30 by, for example, paying for a value-added information usage fee, thereby enjoying the value-added information services (playing back the value-added information). The accounting processing for the services can be performed by the accounting server 40 on the network.

The content playback apparatus 20 is able to select the favorite information or the type of content playback operation by utilizing the various types of value-added information. More specifically, the following features can be implemented in the content playback apparatus 20: (1) searching for popular titles, for example, obtaining currently popular titles; (2) performing a digest playback operation, for example, selecting and playing back the scenes only having the highest popular points; and (3) skipping uninteresting scenes, for example, skipping the scenes having the highest uninteresting points while playing back the content.

The above-described value-added information services are prepared according to attributes, such as the age group, the gender, the life-style, etc.

Figure 3:
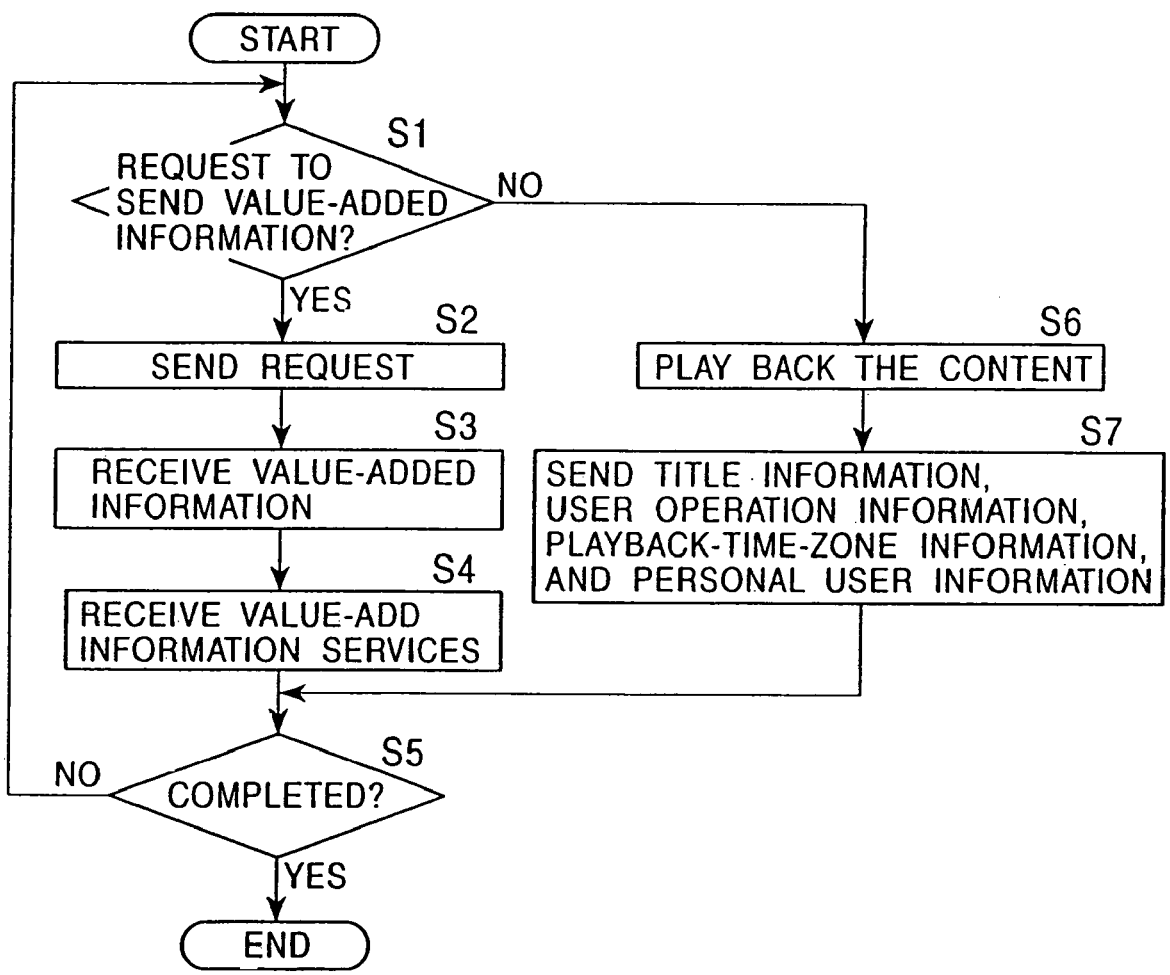
FIG. 3 is a flow chart illustrating the processing executed by the content playback apparatus 20.

FIG. 3 is a flow chart illustrating the processing executed by the content playback apparatus 20 according to this embodiment of the present invention. In practice, this processing is implemented by executing a predetermined program code by the CPU 21. The operation of the content playback apparatus 20 is described below with reference to the flow chart of FIG. 3.

The CPU 21 determines in step S1 whether the user has made a request to send value-added information by operating the operation information interface 24.

If the outcome of step S1 is no, the process proceeds to step S6 in which the CPU 21 causes the content playback apparatus 20 to perform a regular operation, such as play, fast-forward, pause, or rewind, in response to the user operation. Then, in step S7, the title information of the content loaded in the media tray, the user operation information, the playback-time-zone information, the personal user information, etc., are transmitted to the server 30 as material data for creating content digest information.

If it is found in step S1 that the user has made a request to send value-added information, the process proceeds to step S2. In step S2, the request is encoded in the transmitting-information encoder 26, and is then sent to the server 30 by the transmitter/receiver 22. As a result, in step S3, the content playback apparatus 20 receives the value-added information from the server 30 as the content digest information. In step S4, the user of the content playback apparatus 20 is able to enjoy the value-added information services. The accounting server 40 may perform predetermined accounting processing when transmitting and receiving the value-added information.

The value-added information services include a popular title search to obtain currently popular title information, a digest playback operation for selecting and playing back the scenes only having the highest popular points, and a skip playback operation for skipping uninteresting scenes having the highest uninteresting points while playing back the content.

It is then determined in step S5 whether the user has finished the operation by using the operation information interface 24, for example, whether the user has finished the content playback operation or turned off the power source of the content playback apparatus 20. If the outcome of step S5 is yes, this processing routine is completed.

If the result of step S5 is no, the process returns to step S1, and the processing of step S1 and the subsequent steps is repeated.

Figure 4:
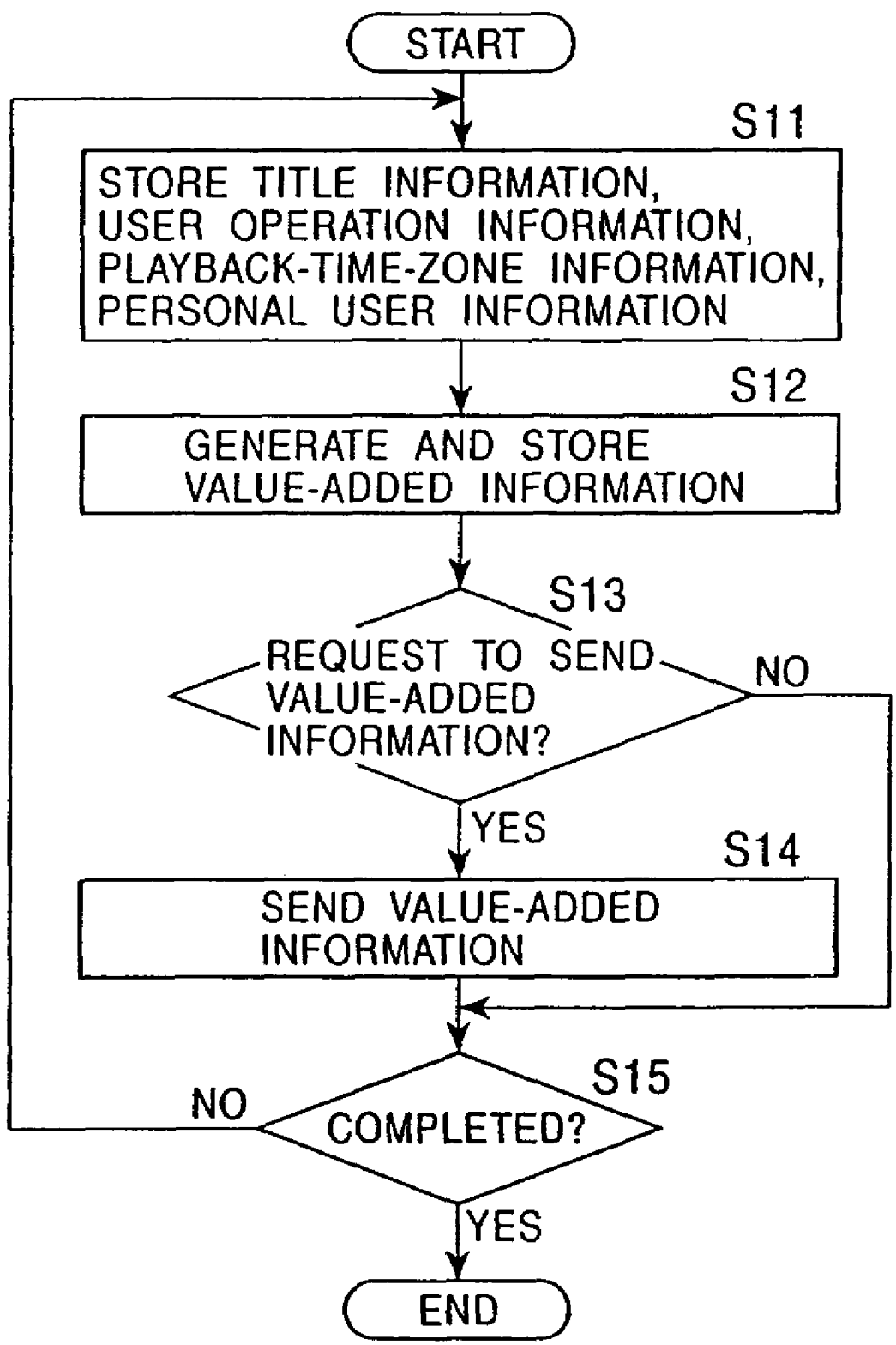
FIG. 4 is a flow chart illustrating the processing executed by the server 30.

FIG. 4 is a flow chart illustrating the processing executed by the server 30 according to this embodiment of the present invention. In practice, this processing is implemented by executing a predetermined program code by the CPU 31. The operation of the server 30 is discussed below with reference to the flow chart of FIG. 4.

In step S11, when the transmitter/receiver 32 receives the title information, the user operation information, i.e., the user favorite data, the playback-time-zone information, the personal user information, etc., from the individual content playback apparatuses 20 connected to the server 30 via a network, these items of information are stored in the received-information storage unit 34.

Then, in step S12, the value-added information generator 35 reads the title information, the user operation information, the playback-time-zone information, and the personal user information from the received-information storage unit 34, and performs predetermined statistical processing on these items of information, thereby generating value-added information as the content digest information. The generated value-added information is stored in the value-added information storage unit 38.

It is then determined in step S13 whether a request to send the value-added information has been received from the content playback apparatus 20. If the result of step S13 is yes, the process proceeds to step S14 in which the corresponding value-added information is read from the value-added information storage unit 38, and is sent to the corresponding content playback apparatus 20. When sending the value-added information, an information usage fee different from the content usage fee may be billed. The accounting processing for billing the use of the value-added information may be performed by the accounting server 40.

In this embodiment, the value-added information can be generated according to the age group, the gender, or the life-style, in the server 30, and the client, i.e., the content playback apparatus 20, is able to select the type of content playback operation suitable for the client by utilizing the value-added information. As discussed above, the value-added information is generated based on the user operation information obtained by performing the regular operation, such as play, pause, fast-forward, and rewind. Accordingly, the user simply views or listens to the scenes that he/she desires without the need to perform a special operation. In other words, the scenes played back by each user is statistically processed so as to automatically generate scenes that the user wishes to view as the value-added information.

The content playback apparatus 20 is described more specifically in the context of a DVD player for playing back data content recorded on a DVD. A description is now given of the processing for generating and distributing the value-added information according to this embodiment when a DVD player is used as the content playback apparatus 20.

Figure 5:
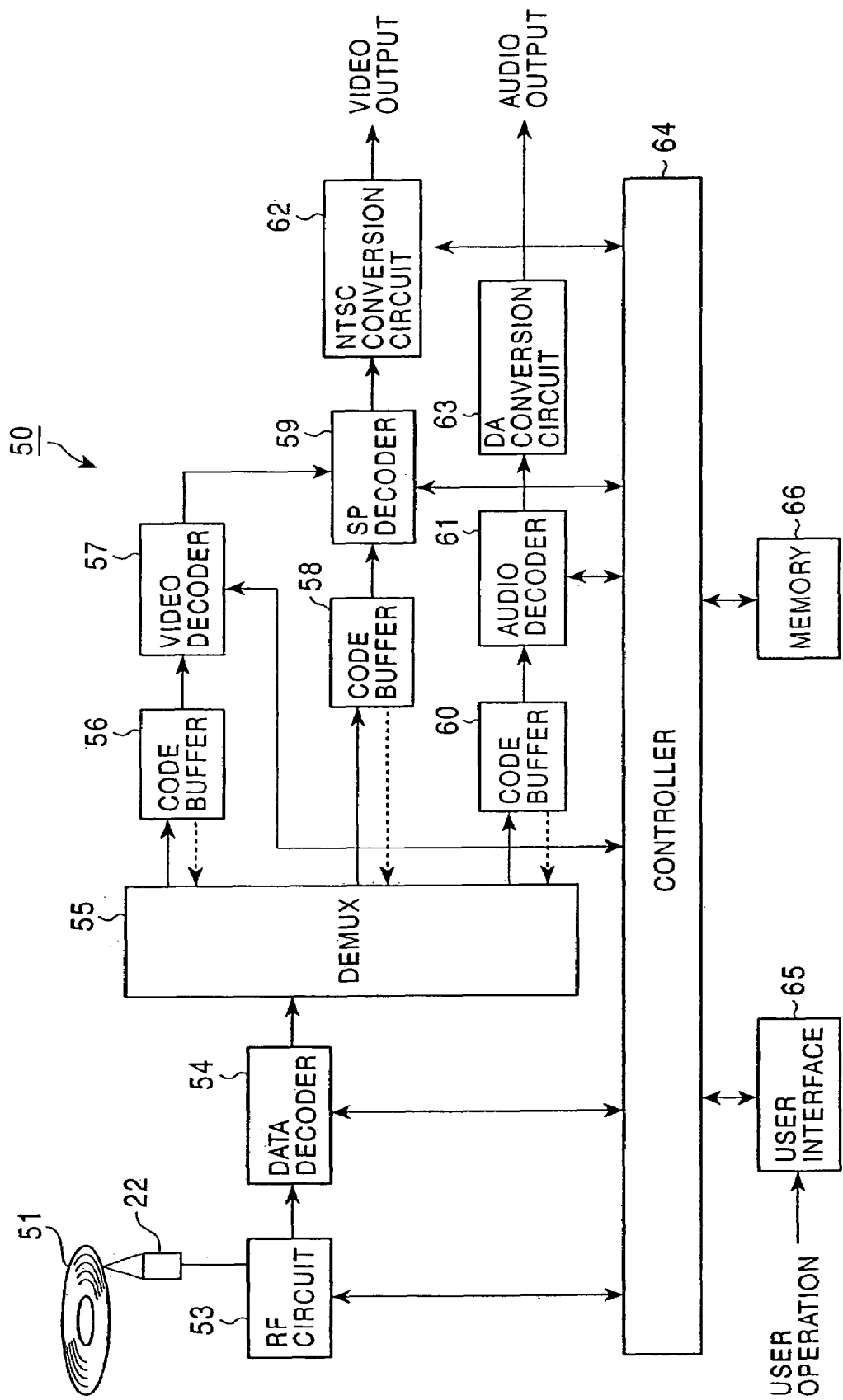
FIG. 5 is a schematic block diagram illustrating the hardware configuration of a DVD player 50 used as the content playback apparatus 20.

FIG. 5 is a schematic block diagram illustrating the hardware configuration of a DVD player applied to this embodiment of the present invention.

A DVD player 50 includes the following elements, as shown in FIG. 5. A pickup 52 plays back a radio frequency (RF) signal from a DVD 51. An RF circuit 53 receives the RF signal from the pickup 52 and binarizes it. A data decoder 54 receives the playback data from the RF circuit 53 and performs decoding processing, such as error correction. A demultiplexer 55 demultiplexes the playback data decoded by the data decoder 54 into encoded video data, encoded SP data, and encoded audio data. A code buffer 56 temporarily stores the encoded video data received from the demultiplexer 25. A video decoder 57 decodes (in this case, expands) the encoded video data received from the code buffer 56. A code buffer 58 temporarily stores the encoded SP data supplied from the demultiplexer 55. An SP decoder 59 decodes the encoded SP data supplied from the code buffer 58. A code buffer 60 temporarily stores the encoded audio data supplied from the demultiplexer 55. An audio decoder 61 decodes the encoded audio data received from the code buffer 60.

The DVD player 50 also includes the following elements. A digital-to-NTSC or PAL conversion circuit (hereinafter simply referred to as the "NTSC conversion circuit") 62 receives the decoded video data and the decoded SP data from the SP decoder 59, and converts them into an NTSC signal or a PAL signal. A digital-to-analog conversion circuit (hereinafter simply referred to as the "D/A conversion circuit") 63 receives the decoded audio data from the audio decoder 61, and converts it into an analog signal. A controller 64 controls the pickup 52, the RF circuit 53, the data decoder 54, the demultiplexer 55, the video decoder 57, the SP decoder 59, the audio decoder 61, the NTSC conversion circuit 62, and the D/A conversion circuit 63. A user interface 65 interfaces the controller 64 and a user input operation. A memory 66 serves as a data storage unit of the controller 64. A transmitter/receiver 67 sends and receives data with the external server 30 (not shown in FIG. 5).

In response to a request from the user via the user interface 65 that a DVD is to be played back by splicing the above-described multiplexed information signal having a predetermined playback unit to another multiplexed information signal without causing a break therebetween, the controller 64 detects the time length from the switching time of the demultiplexer 55 to the time when the video decoder 57 outputs the video data, and controls the decoding operation of the SP decoder 59 according to the detected time length. In this embodiment, the user interface 65 includes instruction buttons (not shown) for regular operations performed on the content recorded on the DVD 51, such as play, fast-forward, pause, rewind, skip, etc. on the content. The user interface 65 may also include instruction buttons for specifying favorite scenes or uninteresting scenes.

In response to the above-described request from the user, the controller 64 also detects the time length from the switching time of the demultiplexer 55 to the time when the video decoder 57 outputs the video data, and controls the decoding operation of the audio decoder 61 according to the time length.

Figure 6:
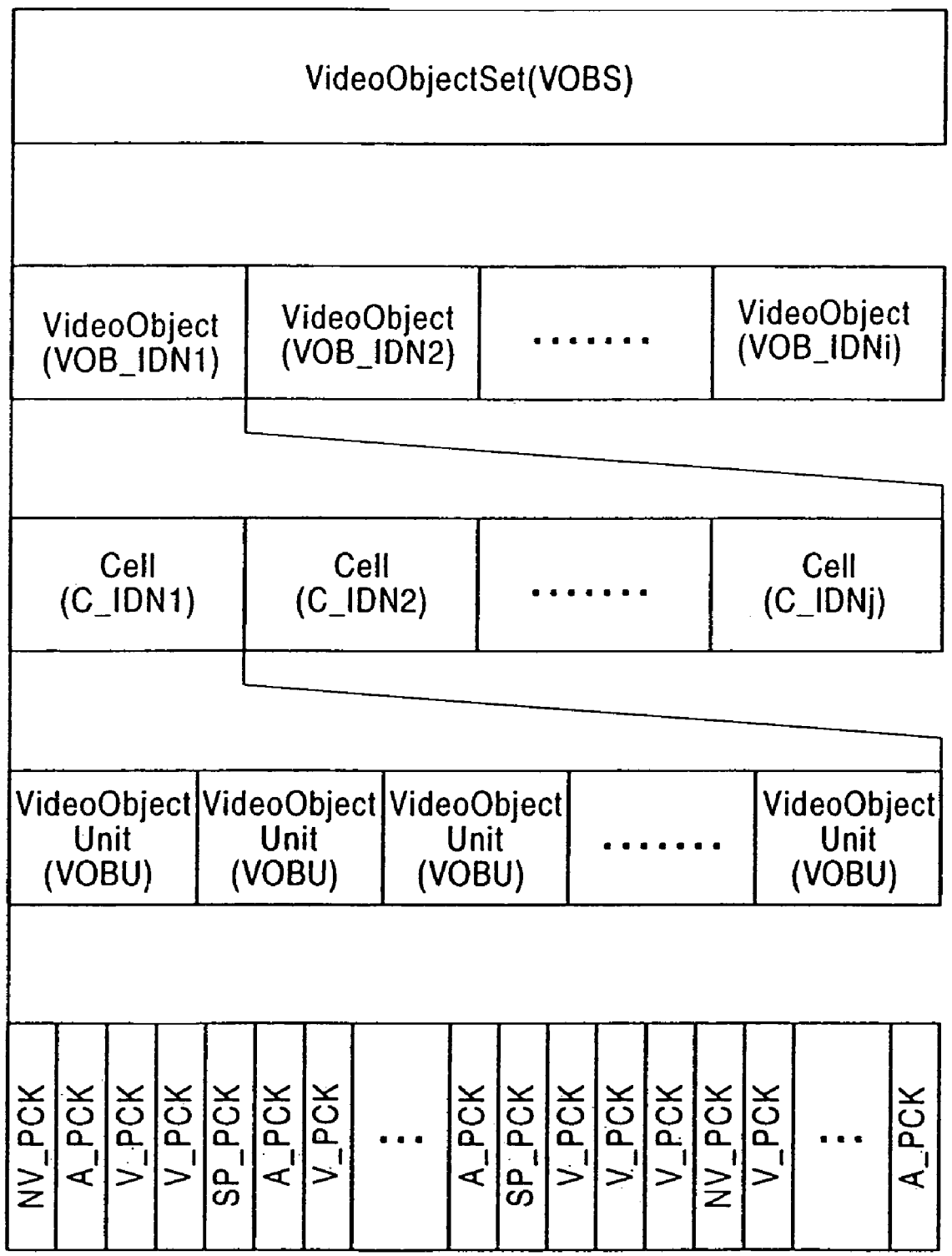
FIG. 6 illustrates an example of the recording format of a DVD.

Generally, on a DVD as a recording medium, as shown in FIG. 6, data is recorded in the unit "Video Object Set" (hereinafter referred to as a "VOBS"), which is a unit for, for example, a piece of movie. This VOBS is formed of a plurality of "Video Objects" (hereinafter referred to as a "VOB"). The DVD has a multi-story format which enables a viewer to observe different stories for one movie. According to this function, each VOB has a different story.

The VOB is formed of a plurality of cells (Cell). The cell is a unit for one scene of, for example, a movie. Accordingly, a combination of the different scenes forms a VOB. According to different types of combinations of the scenes, the multi-story function can be implemented. According to this multi-story function, a plurality of stories are recorded on a DVD, and a viewer is able to select a desired story on a menu displayed while playing back the content.

The cell is formed of a plurality of "Video Object Units" (hereinafter referred to a "VOBU"). The VOBU has a unit of 0.8 to 1.2 seconds for a moving picture, and contains "Group of Pictures" (hereinafter referred to as "GOPs") in the MPEG2 format.

Figure 7:
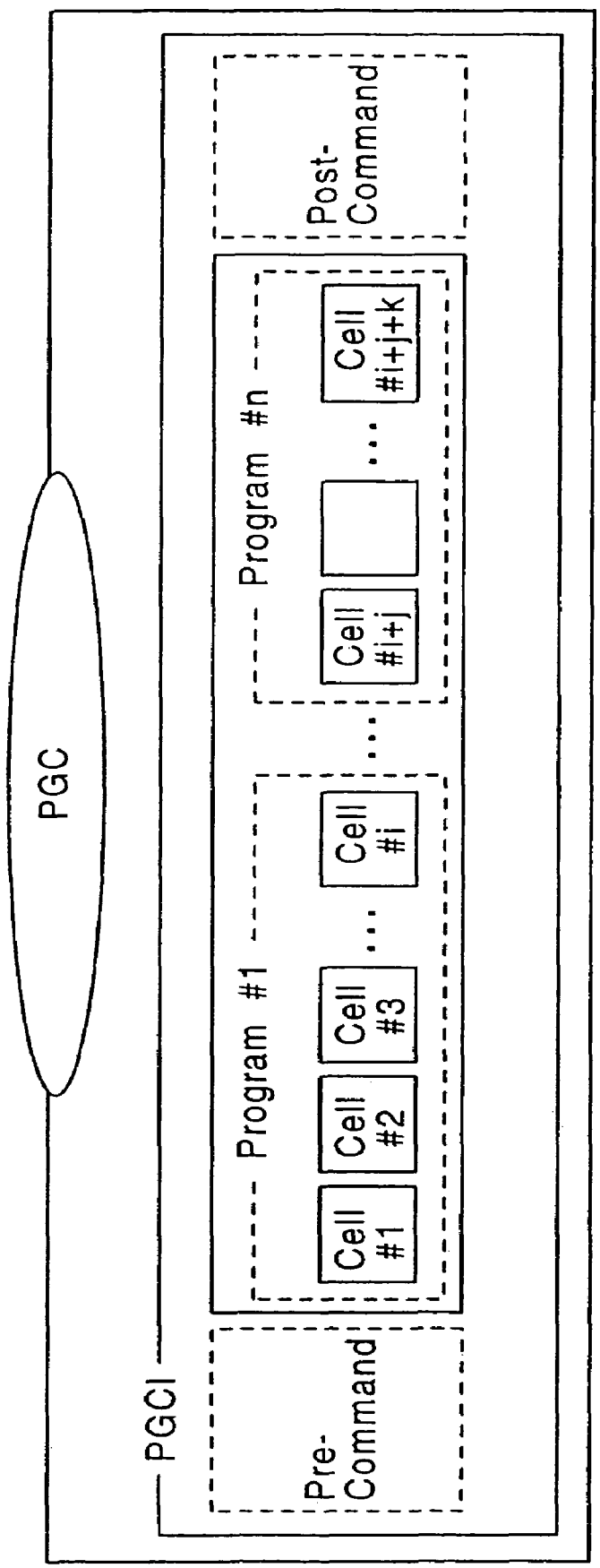
FIG. 7 schematically illustrates the program chain (PGC) structure defined by DVD-VIDEO standards.

In the DVD-VIDEO standards, the program chain (PGC) structure is defined, as shown in FIG. 7. In this structure, based on PGC information (PGCI) indicating the presentation essence and order, data is recorded as a PGC formed of a plurality of programs (PG). In most cases, the above-described cells are not recorded on the DVD in the playback order, and the information concerning the playback order and the recording position of the cells is recorded on the PGCI of the DVD.

The PGC is a logical unit for providing the individual menu screens, video data, and titles, and is formed based on the PGCI. One PGC is divided into an integral number of PGs. The PG is a unit obtained by dividing the content of the PGC. One PG is formed of an integral number of cells. In the DVD player, the PGCI is obtained, and the PGC is played back based on the PGCI. The PGCI is formed of a pre-command area, a post-command area, and a presentation control block. According to this presentation control block, a navigation command for controlling the playback order of cells and the presentation is provided.

Figure 8:
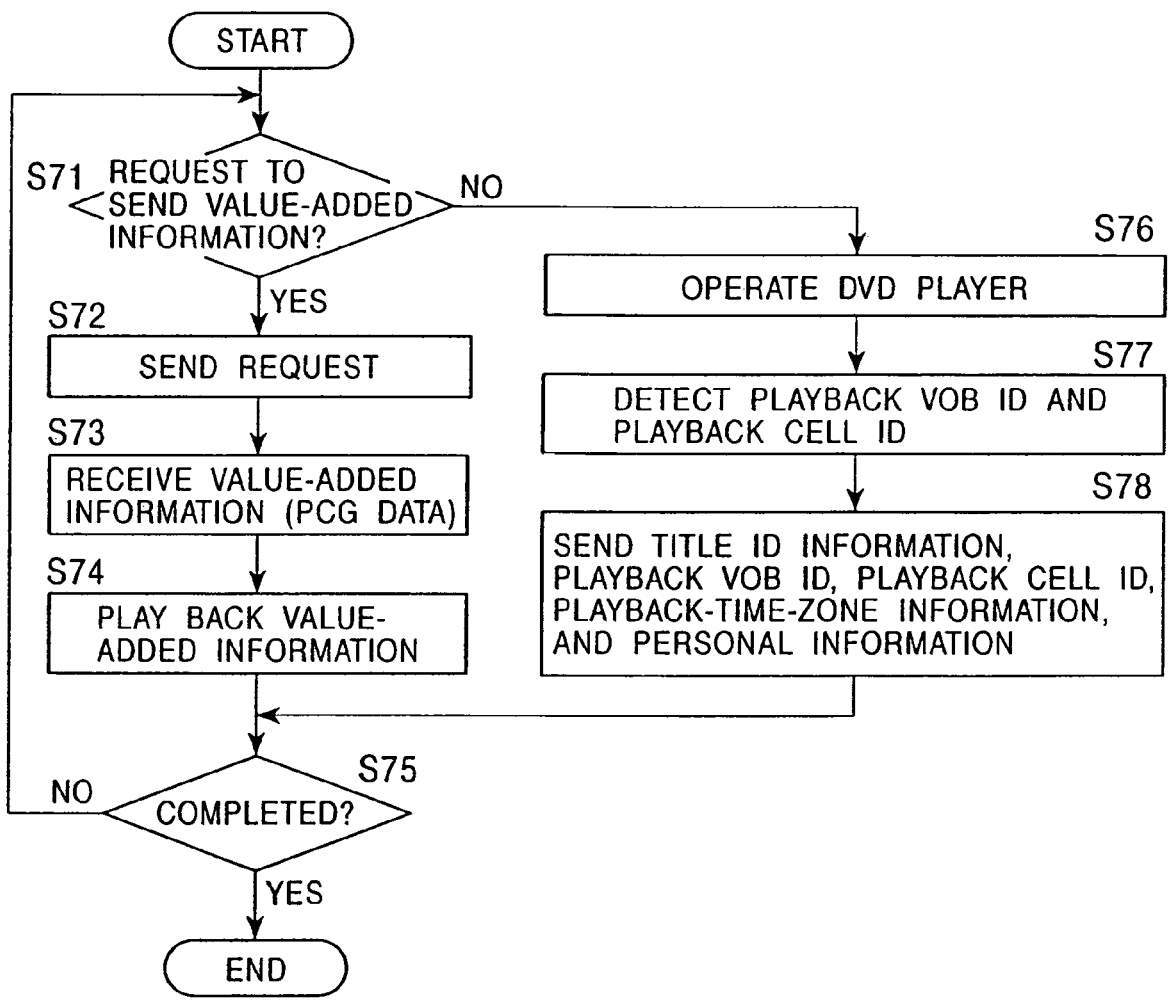
FIG. 8 is a flow chart illustrating the processing executed by the DVD player 50 as a client.

FIG. 8 is a flow chart illustrating the processing performed by the DVD player 50, which serves as a client. In practice, this processing is implemented by reading a predetermined program code from the memory 66 and executing it by the controller 64. The client processing is now described with reference to the flow chart of FIG. 8.

The controller 64 first determines in step S71 whether the user has made a request to send value-added information via the user interface 65.

If the outcome of step S71 is no, the process proceeds to step S76 in which the DVD player 50 performs a regular playback operation on the content. The regular operation includes play, fast-forward, pause, and rewind operations. Then, in step S77, the ID number of the currently operated VOB (hereinafter simply referred to as the "playback VOB ID") and the ID number of the currently operated cell (hereinafter simply referred to as the "playback cell ID") are detected. Then, in step S78, the title ID of the DVD content which is currently played back, the VOB ID, the cell ID, the playback-time-zone information, and the personal information are sent to the server 30 via the transmitter/receiver 67 as material data used for generating the content digest information. While the content is being played back, the above-described processing is repeated.

If it is found in step S71 that the user has made a request to send value-added information, the process proceeds to step S72 in which the request is sent to the external server 30 by the transmitter/receiver 67. As a result, in step S73, the content playback apparatus 20 (DVD player 50) receives the PGC data from the server 30 as the value-added information. In step S74, the DVD player 50 is able to play back the value-added information of the DVD content, as discussed above. The server 30 may perform accounting processing for billing an information usage fee different from the content usage fee when sending the value-added information. This accounting processing may be performed by the accounting server 40.

The value-added information services include a popular title search to obtain currently popular title information, a digest playback operation for selecting and playing back the scenes only having the highest popular points, and a skip playback operation for skipping uninteresting scenes having the highest uninteresting points while playing back the content.

It is then determined in step S75 whether the user has finished the operation by using the operation information interface 65, for example, whether the user has finished the content playback operation or turned off the power source of the DVD player 50. If the outcome of step S75 is yes, this processing routine is completed.

If the result of step S75 is no, the process returns to step S71, and the processing in step S71 and the subsequent steps is repeated.

Figure 9:
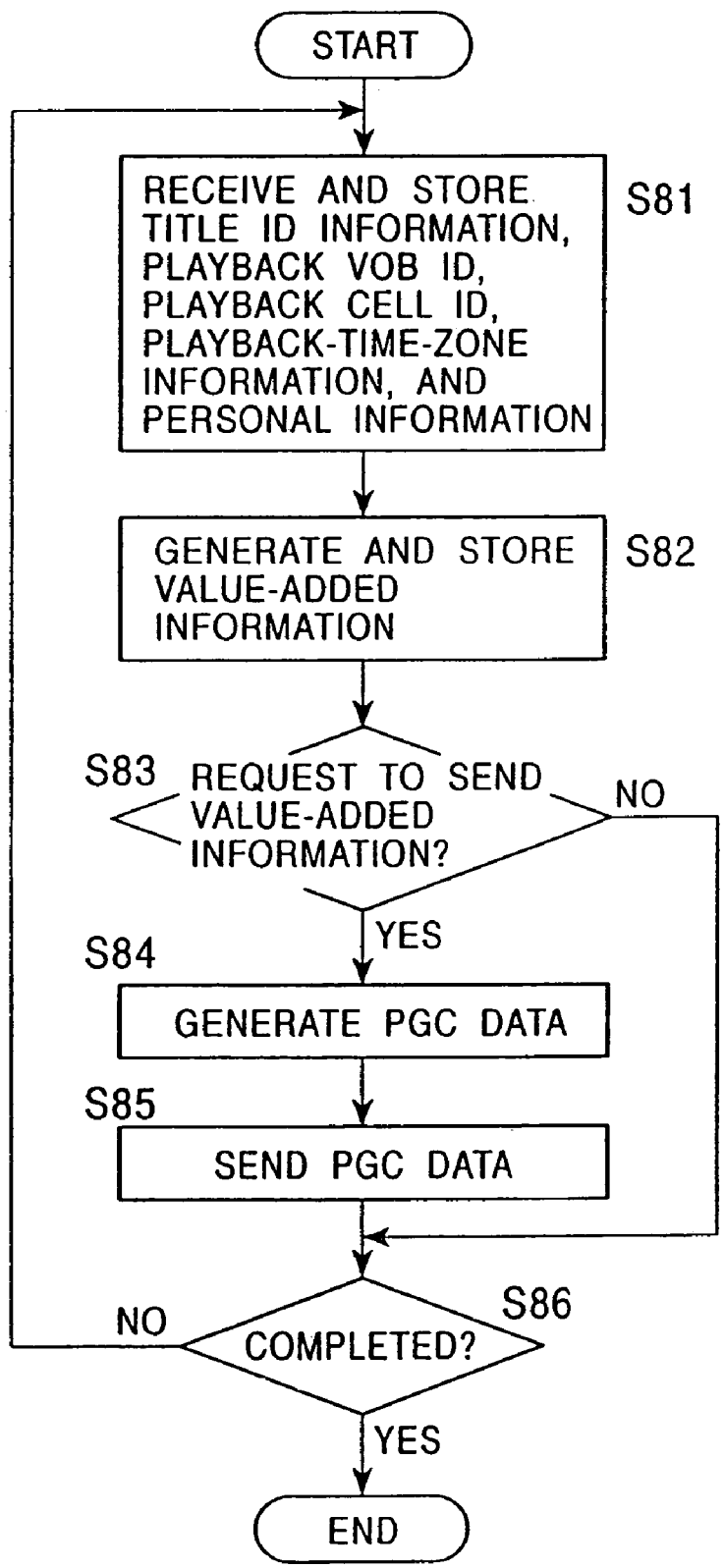
FIG. 9 is a flow chart illustrating the processing executed by the server 30 for providing value-added information services to each DVD player.

FIG. 9 is a flow chart illustrating the processing performed by the server 30 for providing value-added information services to each DVD player 50. In practice, this processing is implemented by executing a predetermined program code by the CPU 31. The operation of the server 30 is discussed below with reference to the flow chart of FIG. 9.

In step S81, the transmitter/receiver 32 of the server 30 receives user favorite data, such as the playback title ID, the playback VOB ID, and the playback cell ID, the playback-time-zone information, and the personal user information from each DVD player 50 via a network, and these items of information are stored in the received-information storage unit 34.

Then, in step S82, the title information, the user operation information, the playback-time-zone information, the personal user information, etc., are read from the received-information storage unit 34, and the value-added information generator 35 performs statistical processing on these items of information, thereby generating the value-added information. The value-added information is then stored in the value-added information storage unit 38.

It is then determined in step S83 whether a request to send the value-added information has been received from the DVD player 50. If the outcome of step S83 is yes, the process proceeds to step S84 in which PGC data is generated based on the corresponding value-added information. Then, in step S85, the PGC data is sent to the corresponding client by the transmitter/receiver 32. It is then determined in step S86 whether the user has finished the operation. If the result of step S86 is yes, this processing routine is completed. If the outcome of step S86 is no, the process returns to step S81 in which the corresponding processing is repeated. The server 30 may bill for an information usage fee different from the content usage fee when sending the value-added information. This processing may be performed by the accounting server 40.

Figure 10:
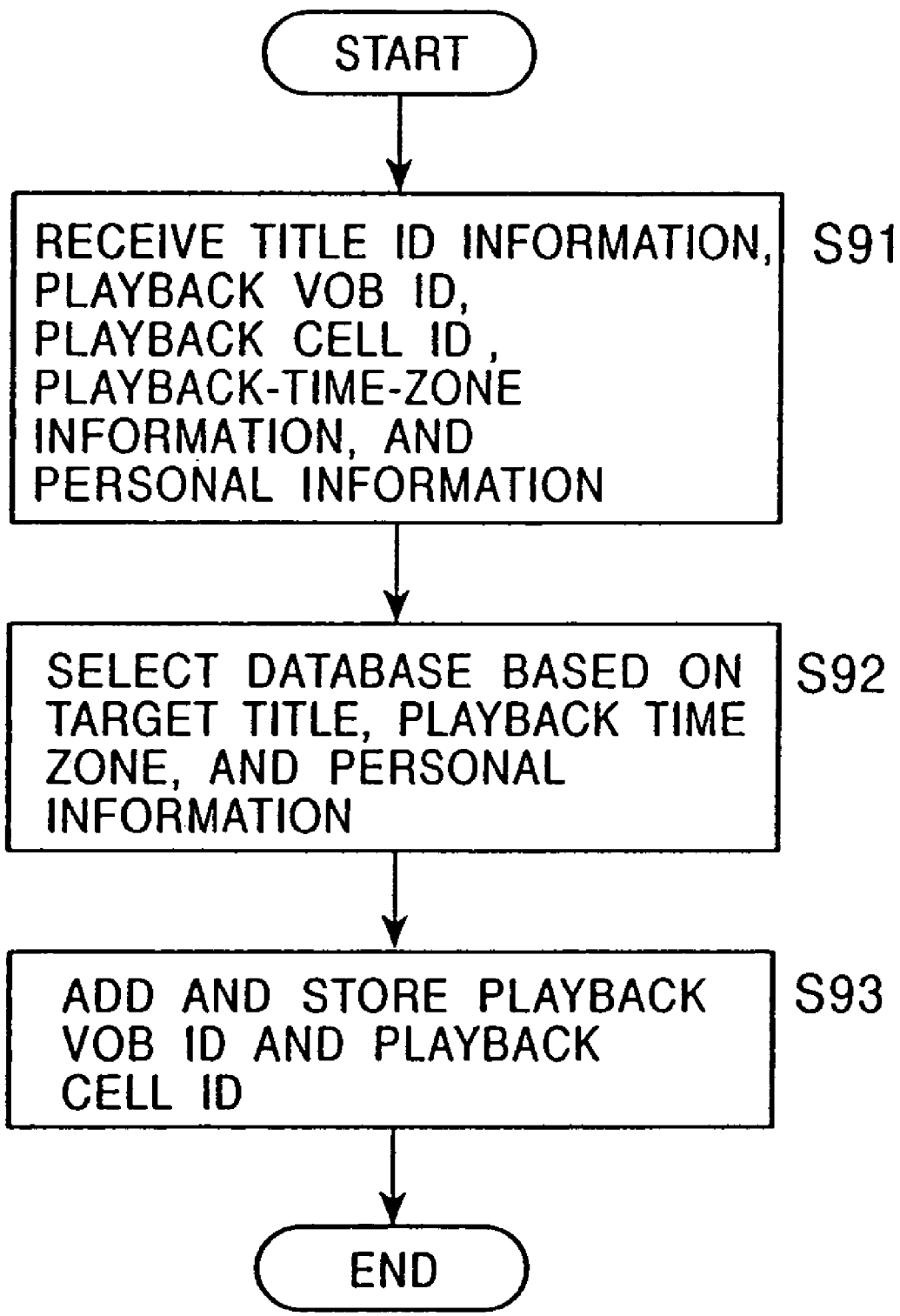
FIG. 10 is a flowchart illustrating the processing for creating value-added information executed by the server 30 shown in FIG. 1.

FIG. 10 is a flow chart illustrating the processing for generating the value-added information of the content by the server 30. In practice, this processing is implemented by executing a predetermined program code by the CPU 31. The processing for generating the value-added information is discussed below with reference to the flow chart of FIG. 10.

In step S91, the transmitter/receiver 67 receives the user favorite data indicating the playback title ID, the playback VOB ID, and the playback cell ID, the playback time-zone information, and the personal information from each DVD player 50, which serves as a client.

Figure 11:
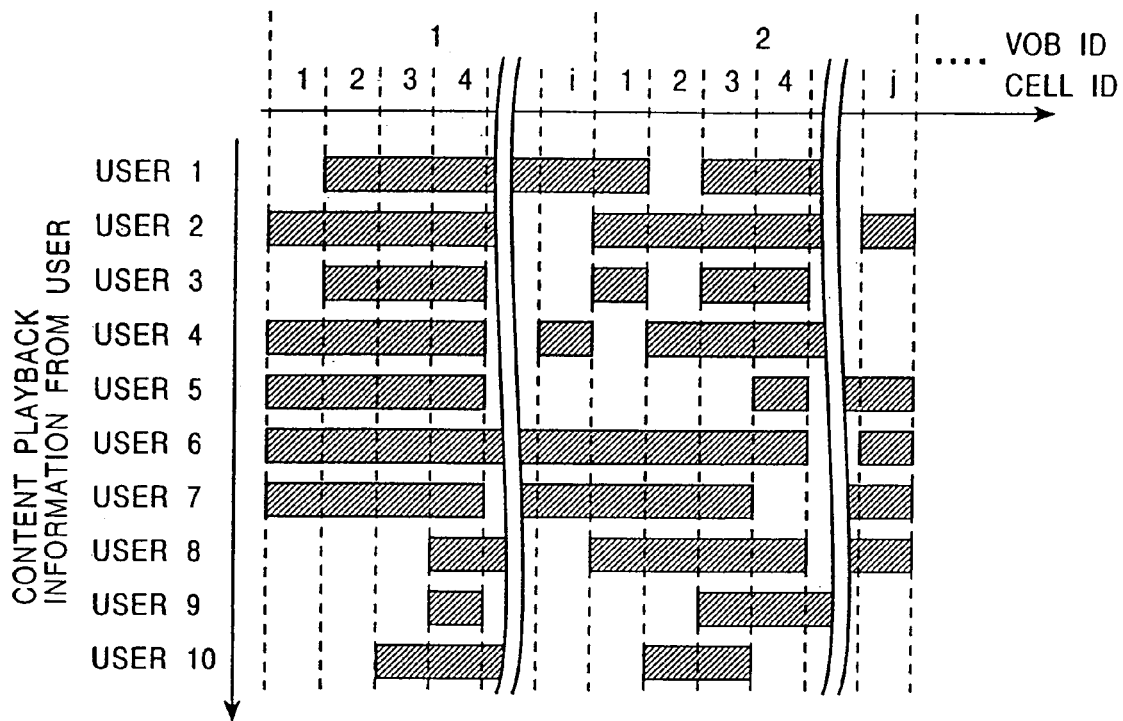
FIG. 11 schematically illustrates a result obtained by computing the content playback information of the users input from the individual DVD players.

FIG. 11 schematically illustrates the result obtained by computing the content playback information sent from the users of the DVD players. As shown in FIG. 11, the VOB IDs and the cell IDs of the content which was played back by each user can be specified.

Figure 12:
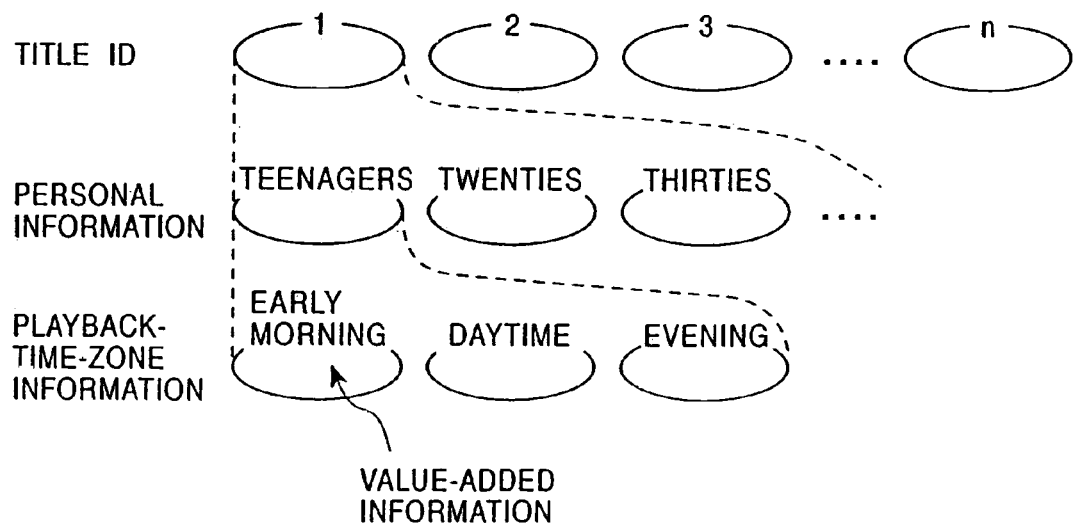
FIG. 12 illustrates an example of the configuration of a value-added information database.

In step S92, the corresponding database is selected based on target information, such as the title, the playback time zone, or the personal information. In this embodiment, the value-added information database is stored by being classified, as shown in FIG. 12, according to the title, the personal information, and the playback time zone.

Subsequently, in step S93, the currently played back VOB ID and the cell ID are added and stored to the selected database.

Figure 13:
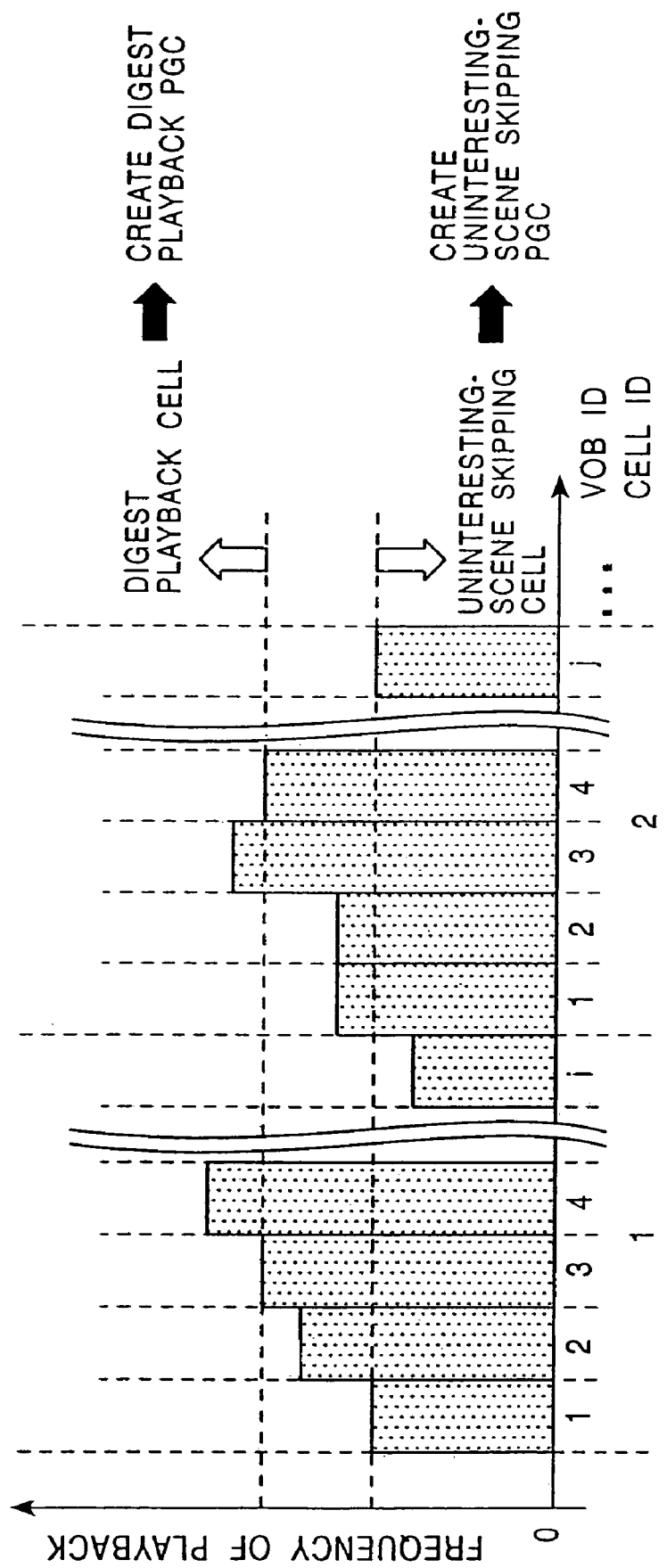
FIG. 13 illustrates a result obtained by accumulatively adding the playback Video Object Set (VOB) ID numbers and the playback cell ID numbers.

FIG. 13 illustrates the result obtained by accumulatively adding the playback VOB ID and the playback cell ID. As shown in FIG. 13, according to this accumulation result, the frequency of playback operations of each VOB ID or each cell ID can be shown as a histogram.

In response to a request to send the value-added information from the DVD player 50, which serves as a client, the server 30 creates PGC data based on the value-added information shown in FIG. 13, and returns it to the client. For example, if the client has made a request to send the value-added information for the digest playback operation, the server 30 creates the PGC data for enabling the client to play back only the VOBs and cells having a frequency of playback operations of a predetermined threshold or greater, and sends the created PGC data to the client. If the client has made a request to send the value-added information for the skip playback operation, the server 30 creates the PGC data for enabling the client to skip the VOBs and cells having the frequency of playback operations of a predetermined threshold or lower, and sends the created PGC data to the client.

The server 30 may bill for an information usage fee different from the content usage fee when sending the PGC data. The accounting processing may be performed by the accounting server 40.

Figure 14:
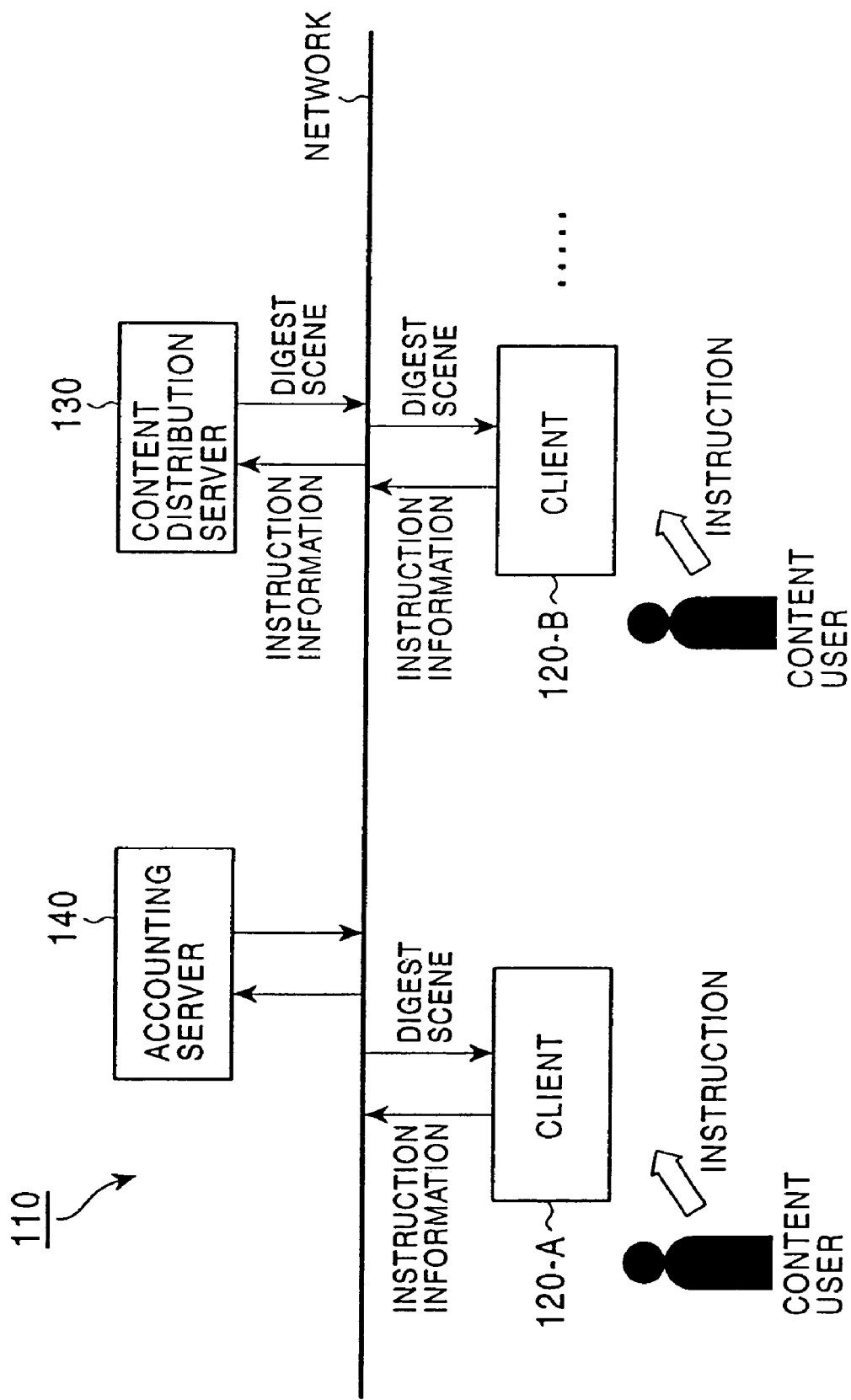
FIG. 14 is a schematic diagram illustrating the configuration of a network system 110 according to another embodiment of the present invention.

FIG. 14 schematically illustrates the configuration of a network system 110 according to another embodiment of the present invention. The network system 110 is formed of: a content distribution server 130 for distributing or delivering the content of a time-based event (for example, sport programs and dramas) and content digest information; at least one client 120-A, 120-B, and so on (hereinafter referred to as the "client 120" unless it is necessary to distinguish them individually) for receiving and viewing the content; and an accounting server 140 for performing accounting processing for the distribution and delivering of the digest information. The distribution or the delivering of the information content may be charged to the user, or the user may receive it free. The content may be distributed via broadcast waves (not shown) rather than a network.

In this embodiment, the client 120 is provided with a device for specifying a scene that the client 120 wishes to view, which is discussed in detail below. The server 130 is able to dynamically generate a digest scene as the content digest information of the event, and provides it in response to a request sent from the client 120 by using the above-described device.

For example, for the viewers who have started to watch the event half way through, a digest scene indicating the past progress of the event can be provided. According to the time when the viewer has started to watch the event, an optimal digest scene can be continuously generated. Thus, even for the viewers who have started the event half way through, they are informed of the past progress of the event based on the digest scene, and are thus able to follow the subsequent event.

Figure 15:
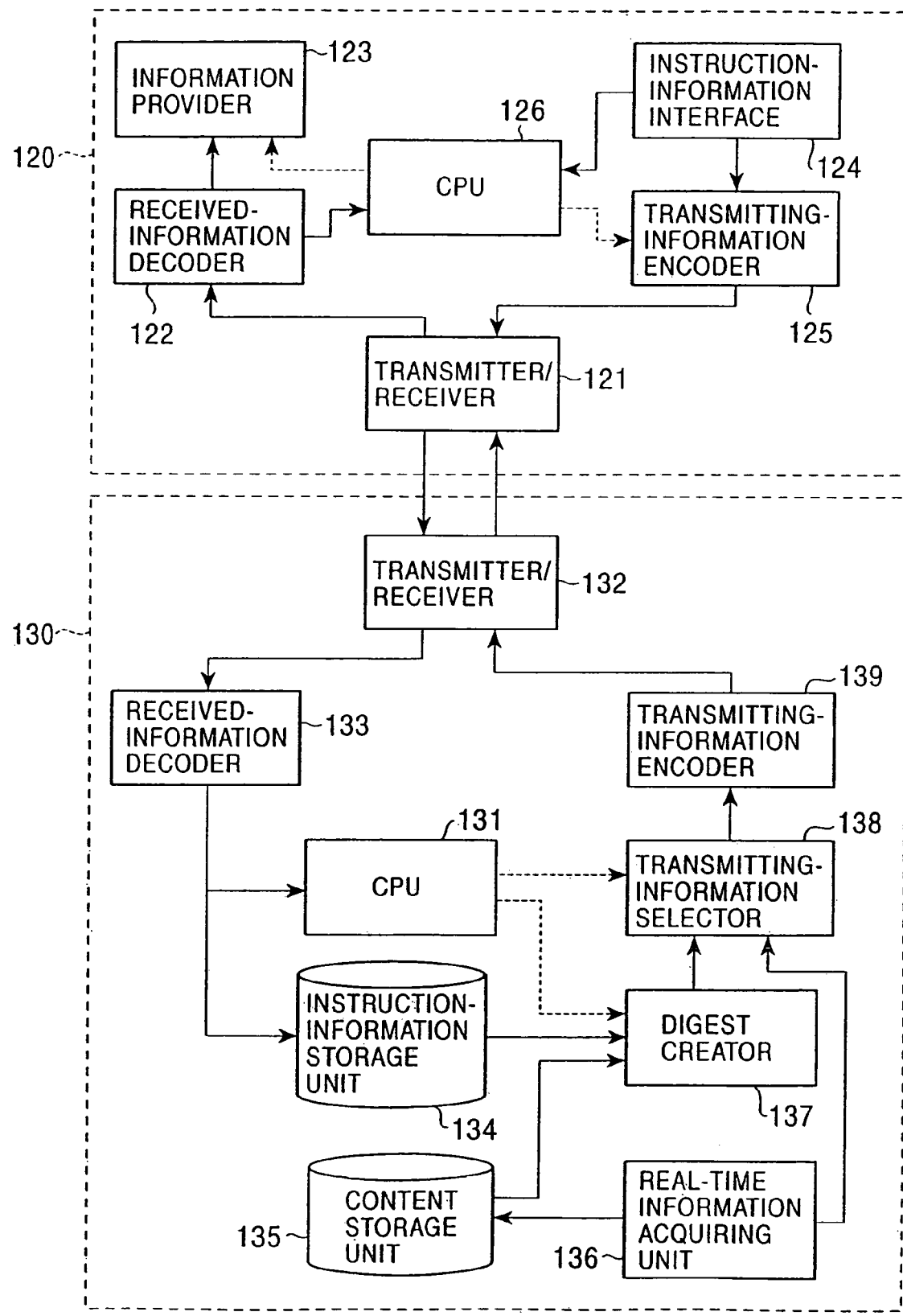
FIG. 15 is a block diagram illustrating the functional configuration of a client 120 and a server 130 shown in FIG. 14.

FIG. 15 is a block diagram illustrating the functional configuration of the client 120 and the content distribution server 130.

The client 120 is formed of, as shown in FIG. 15, a transmitter/receiver 121, a received-information decoder 122, an information provider 123, an instruction-information interface 124, a transmitting-information encoder 125, and a CPU 126. Under the overall control of the CPU 126, the client 120 is able to play back the received content and perform the accompanying processing (for example, playing back the value-added information of the received content).

The content of the event distributed from the content distribution server 130 is received by the transmitter/receiver 121. The received-information decoder 122 then decodes the received data to reproduce the original content, and provides it to the viewer on the information provider 123.

The instruction-information interface 124 is formed of a device for specifying a scene, such as an interesting scene, an uninteresting scene, a scene that the user wishes to watch. By using the instruction-information interface 124, the user is able to specify the scene spatially or temporally. The instruction information input by the user via the instruction-information interface 124 can be used as material data for creating a digest scene. The instruction information is then sent to the transmitting-information encoder 125. The transmitting-information encoder 125 then encodes the instruction information and sends it to the content distribution server 130 by the transmitter/receiver 121.

Only one client 120 is shown in FIG. 15. In practice, however, many clients are connected to the content distribution server 130, and a plurality of pieces of instruction information are accordingly sent to the content distribution server 130 from the individual clients 120 and are stored in the server 130.

The content distribution server 130 is formed of a CPU 131, a transmitter/receiver 132, a received-information decoder 133, an instruction-information storage unit 134, a content storage unit 135, a current information acquiring unit 136, a digest creator 137, a transmitting-information selector 138, and a transmitting-information encoder 139. Under the control of the CPU 131, the content distribution server 130 distributes the content, and also dynamically creates a digest scene as the content digest information and distributes it.

The instruction information sequentially received by the transmitter/receiver 132 is decoded in the received-information decoder 133, and is stored in the instruction-information storage unit 134.

The real-time information acquiring unit 136, which is, for example, a camera device, a microphone, or an audio recording device, obtains the distribution content in real time. When regular content distribution processing is performed, the real-time information is sent to the transmitting-information encoder 139 via the transmitting-information selector 138 and is encoded. Then, the encoded real-time information is distributed to each client 120 from the transmitter/receiver 132. The real-time information is also stored in the content storage unit 135.

The digest creator 137 dynamically creates a digest scene of the event content as the digest information. For example, the digest creator 137 reads the instruction information from instruction-information storage unit 134, and performs statistical processing on the instruction information, thereby extracting the portions which have been frequency specified in the time-space domain as the digest scene. Details of processing for creating the digest scene are given below.

The digest scene as the content digest information is created continuously, and is supplied to the transmitting-information selector 138. According to the operating mode, the transmitting-information selector 138 selects the real-time content supplied from the real-time information acquiring unit 136 or the corresponding digest scene, and sends the selected information to the transmitting-information encoder 139. That is, the real-time content is selected when distributing the regular content, and the digest scene is selected in response to a request to send the digest scene.

The transmitting information selected by the transmitting-information selector 138 is encoded in the transmitting-information encoder 139, and is then distributed to the client 120 from the transmitter/receiver 132. Instead of the digest scene itself, index information for extracting the digest scene from the original content may be transmitted to the client 120.

The content distribution server 130 may bill an information usage fee different from the content usage fee when sending the digest scene. This accounting processing may be performed by the accounting server 140.

Figure 16:
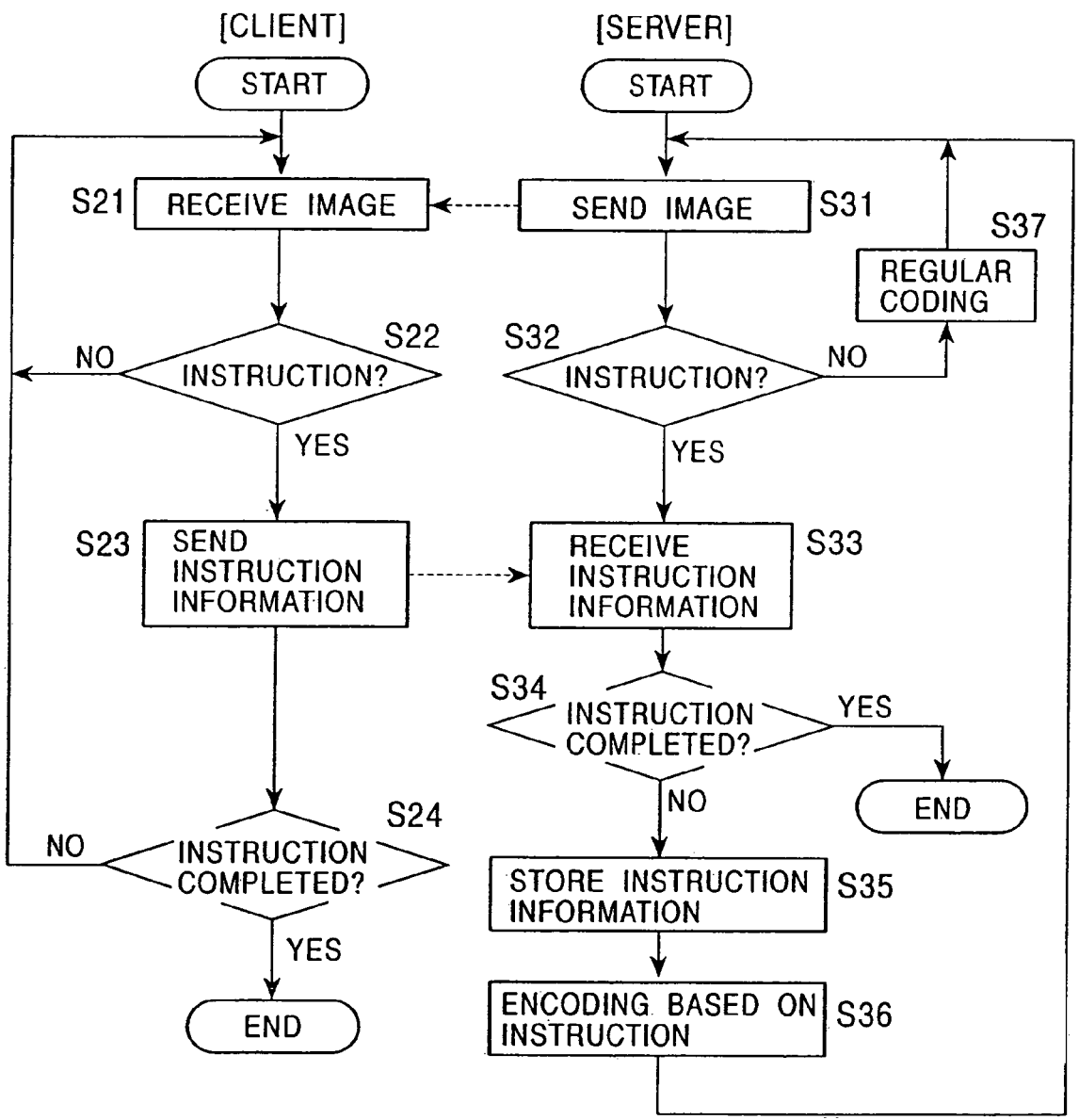
FIG. 16 is a flow chart illustrating the processing executed by the client 120 and the server 130 when regular content distribution processing is performed.

FIG. 16 is a flow chart illustrating the processing performed by both the client 120 and the server 130 when the regular content distribution processing is executed. In practice, this processing is implemented by a cooperative operation of the CPU 126 of the client 120 and the CPU 131 of the server 130. In the example shown in FIG. 16, assist communication is applied to the content distribution. The "assist communication" is a system which performs high-resolution encoding on the portions (scenes) that the user has specified, and performs low-resolution encoding on the portions (scenes) that the user has not specified. According to this system, an image desired by the user can be provided using a small bandwidth. In order to enjoy this advantage, the viewer has to specify the portions (scenes) that he/she wishes to watch. Conversely, however, by specifying the scenes that the viewer wishes to watch, such scenes can be provided with high resolution. This provides a strong incentive to viewers to provide material data for creating a digest scene to the content distribution server 130.

The regular content distribution processing according to this embodiment is described below with reference to the flow chart of FIG. 16.

In steps S21 and S31, the image content is transmitted and received between the client 120 and the content distribution server 130. In the server 130, the real time content to be transmitted is read from the real-time information storage unit 136, and is subjected to predetermined encoding in the transmitting-information encoder 139. Then, the encoded content is distributed from the transmitter/receiver 132. In the client 120, the received content is subjected to predetermined decoding processing in the received-information decoder 122, and is then provided on the information provider 123, such as a monitor display. The image content may be a time-based event, such as a movie, drama, or a sport program, or may be the broadcast content distributed from a predetermined broadcast station.

While there is no input of instruction information from the instruction-information interface 124 in the client 120 (i.e., the result of step S22 or S32 is no), regular encoding processing is performed in the content distribution server 130 in step S37. Then, the image content continues to be transmitted and received in steps S21 and S31. The "regular encoding processing" described above is to encode the content so that, for example, the information is uniformly allocated in the time-space domain.

If it is found in step S22 that there is an input of instruction information from the instruction-information interface 124 of the client 120, the process proceeds to step S23. In step S23, the input instruction information is encoded in the transmitting-information encoder 125, and is sent from the client 120 to the server 130. In step S33, the server 30 accordingly receives the instruction information. As discussed below, the input instruction information is used as material data for creating a digest scene.

In the content distribution server 130, in step S35, the received instruction information is decoded in the received-information decoder 133, and is then stored in the instruction-information storage unit 134. The stored instruction information is to be utilized for creating a digest scene. In step S36, high-resolution encoding is performed in response to an instruction from the client 120. That is, more information is assigned to the portions that the client 120 has specified than other portions. Then, more detailed information is provided to the viewer. In order to enjoy this advantage, the viewer has to specify the scenes that he/she wishes to watch. Conversely, however, by specifying the scenes that the viewer wishes to watch, such scenes can be provided with high resolution. This provides a strong incentive to viewers to provide material data for creating a digest scene to the content distribution server 130.

Figure 17:
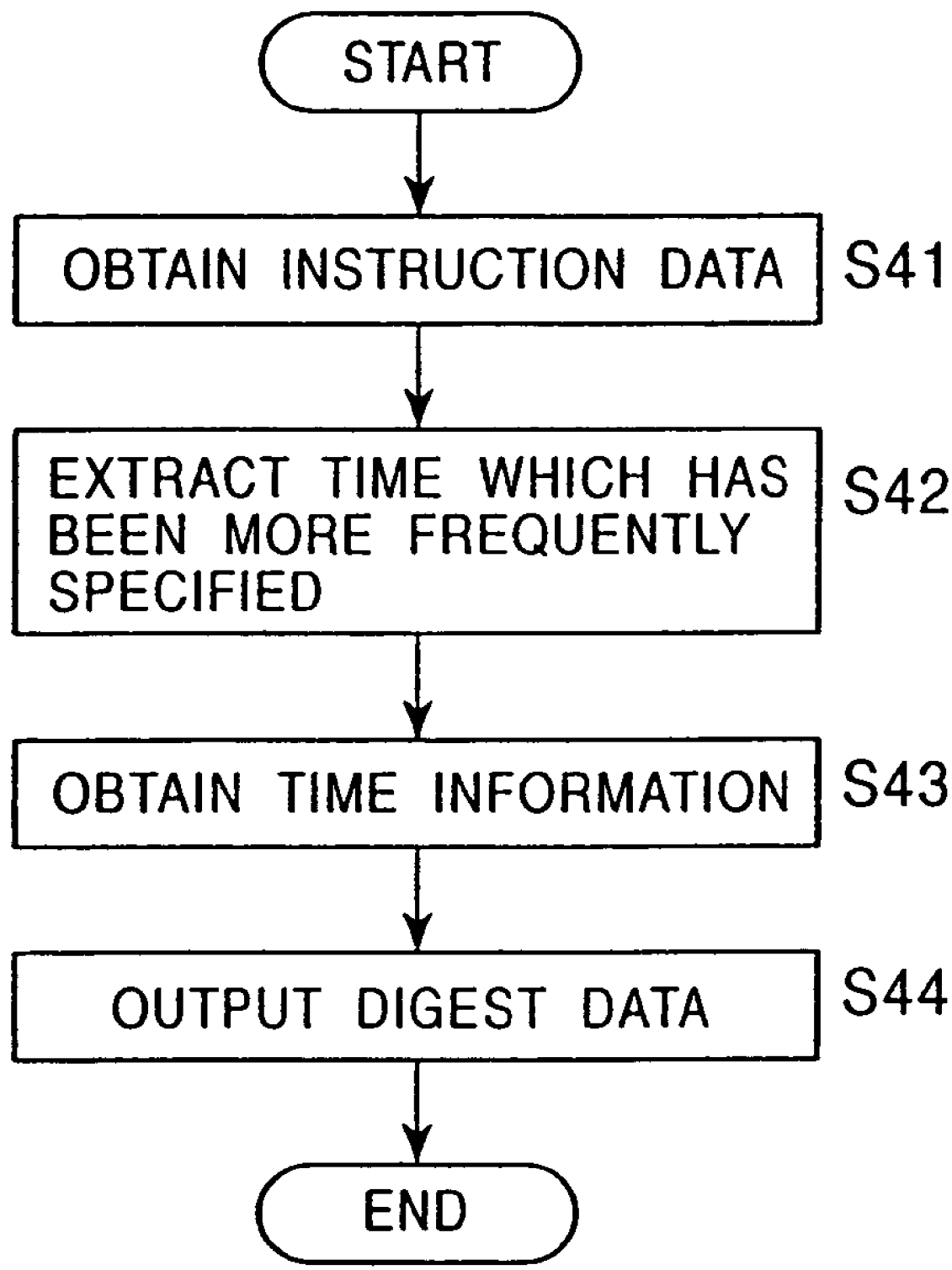
FIG. 17 is a flow chart illustrating the processing for creating a dynamic digest scene.

FIG. 17 is a flow chart illustrating the processing for dynamically creating the digest scene as the content digest information. In practice, this processing is implemented by a cooperative operation of the CPU 131 and the digest creator 137 of the content distribution server 130. The processing for creating the digest scene is described below with reference to the flow chart of FIG. 17.

As discussed above, the instruction information supplied from the individual viewers, i.e., the clients 120, is stored in the instruction-information storage unit 134. In step S141, the digest creator 137 reads the instruction information from the instruction-information storage unit 134.

The instruction information is not uniformly arranged in the time-space domain, but is non-uniformly distributed according to the interest of the viewers. Accordingly, in step S42, the portions which have been more frequency specified in the time-space domain are extracted by the digest creator 137, and in step S43, the time information of such portions is read. In step S44, the content area corresponding to the time information read in step S43 is output to the transmitting-information selector 138 as the digest data. The digest data may be a set of scenes or frames corresponding to the content time information, or may be index information for specifying the corresponding scenes or frames from the content.

Figures 18, 19:
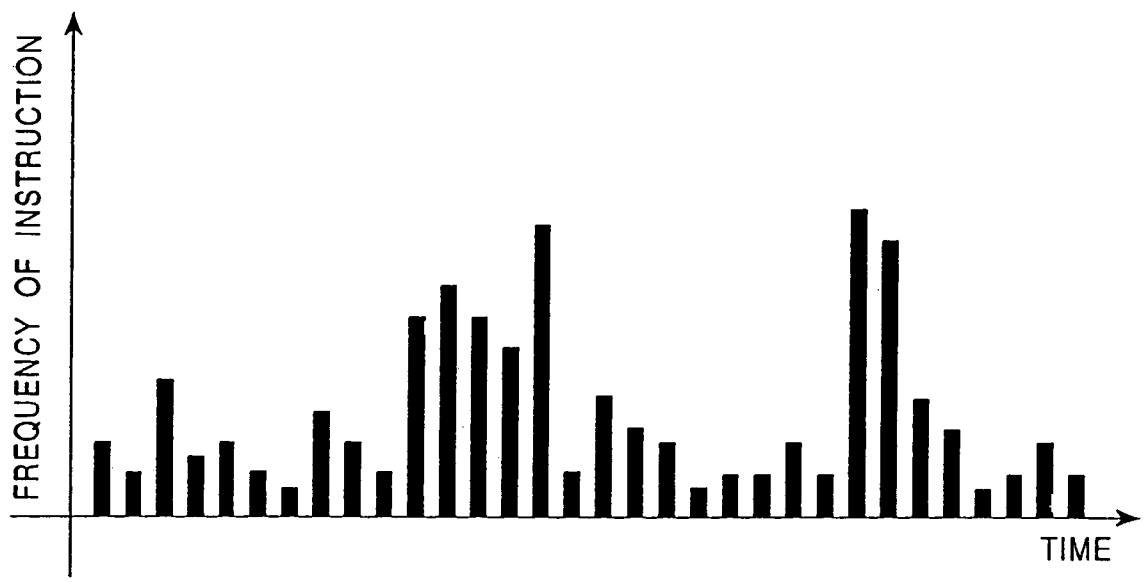
FIG. 18 is a histogram for extracting digest scenes.
FIG. 19 is a digest table in which candidates to be extracted as digest scenes are listed.

For example, the frequency distribution of the time information can be formed based on the instruction information from many viewers, and the time information which is more frequently specified is selected, thereby creating the digest scene. FIG. 18 is a histogram for extracting the digest scene. The digest creator 137 accumulates the points in the time domain at which an instruction is input from a viewer so as to generate a histogram indicating the frequency of instructions.

The digest creator 137 also creates, as shown in FIG. 19, a digest table in which the distribution (broadcast) times which are more frequency specified are listed as candidates of the digest scene.

In the digest table, sorting is sometimes performed according to the magnitude of the evaluation value obtained by the number of instructions detected at the corresponding time. The instruction information is continuously input in the client 120, and thus, the histogram is constantly changing. Accordingly, the order of the candidates in the digest table is changed in real time. For example, if the current evaluation value is greater than the past evaluation value, the rank of the corresponding candidate becomes higher. Accordingly, the digest data output from the digest creator 137 is constantly changing real time data.

In this embodiment, the digest table shown in FIG. 19 is created based on the instruction information from many viewers, and the digest scene is determined by selecting the higher rank of the candidates. For example, the number of digest scenes is determined in advance, and the predetermined number of candidates having the higher ranks are sequentially selected, thereby extracting the digest scenes. Together with the digest scenes, the digest information is extracted from a link to the stored event, and both the digest scenes and the digest information are output. The length of the scene may be determined by the interval between the two scenes. Alternatively, a predetermined period may be allocated to the length of the scene.

Figure 20:
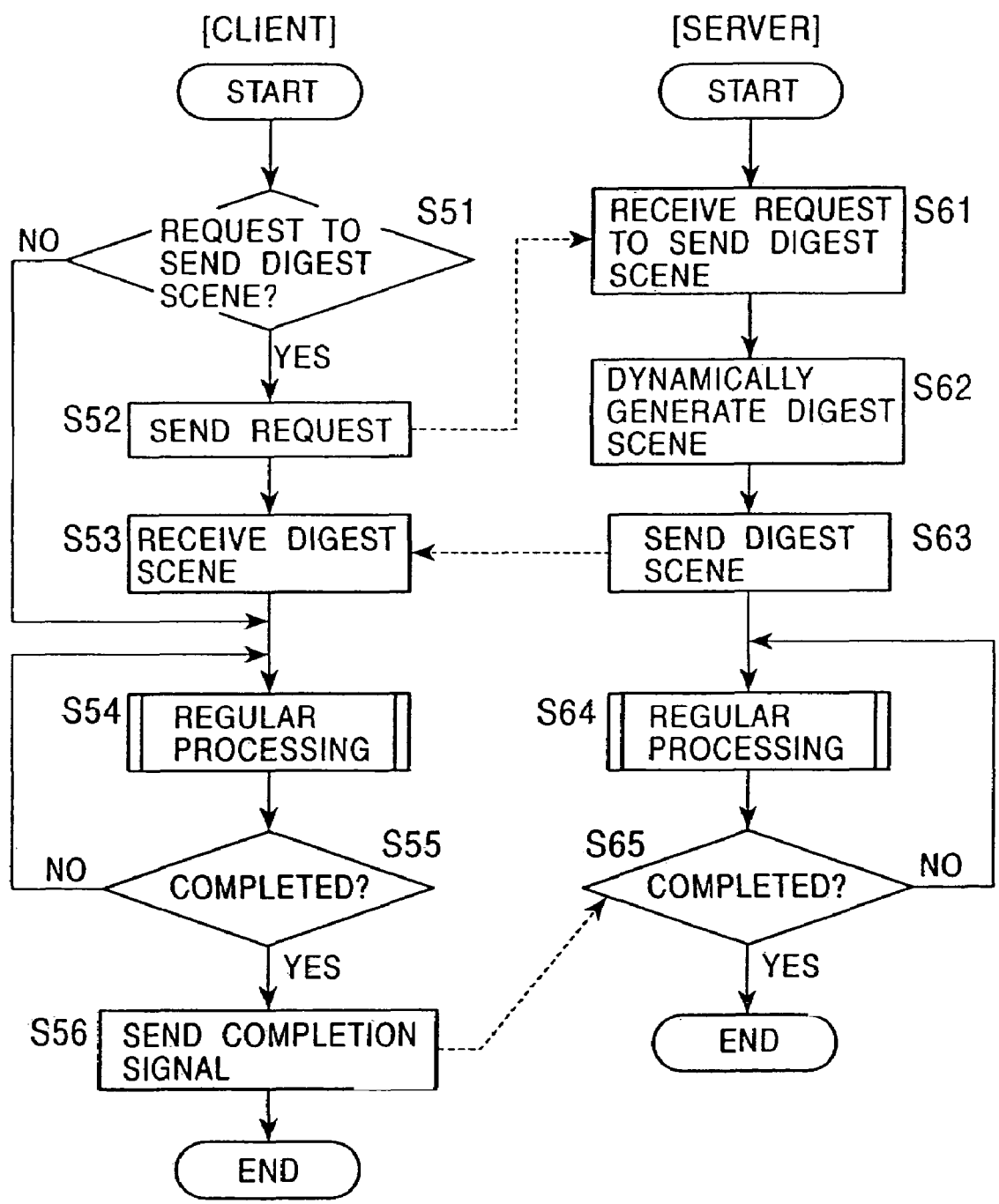
FIG. 20 is a flow chart illustrating the processing for distributing digest information by the client 120 and the server 130.

FIG. 20 is a flow chart illustrating the processing for distributing the digest information. In practice, this processing is implemented by a cooperative operation of the CPU 126 of the client 120 and the CPU 131 of the content distribution server 130. The processing for distributing the digest information is discussed below with reference to the flow chart of FIG. 20.

It is determined in step S51 whether the client 120 has made a request to send a digest scene. If the outcome of step S51 is yes, the process proceeds to step S52 in which the request is sent to the content distribution server 130. User profile information of the client 120, such as the age group, the gender, the life-style, etc., may be attached to the above-mentioned request.

In the content distribution server 130, the request from the client 120 is received by the transmitter/receiver 132 in step S61. Then, in step S62, the digest scene is dynamically created according to the processing shown in FIG. 17. As stated above, "dynamically" means that the digest scene is updated according to the instruction information continuously supplied from the clients, i.e., the viewers.

In the content distribution server 130, in step S63, a suitable entry is extracted from the digest table shown in FIG. 19, and is sent to the corresponding client 120 as the digest scene. For example, the leading entry having the highest evaluation rank in the digest table may be sent as the digest scene, or the entries in the digest table may be filtered according to the user profile information of the client 20.

The content distribution server 130 may bill for an information usage fee different from the content usage fee when sending the dynamic digest scene. This accounting processing may be performed by the accounting server 140 on the network.

If it is found in step S51 that the user has not made a request to send a digest scene, the process proceeds to step S54 in which regular processing shown in FIG. 8 is performed. Accordingly, in step S64, the content distribution server 130 performs regular processing shown in FIG. 9.

During the regular processing, the real-time content, such as a real-time image, is distributed from the content distribution server 130, and the client 120 is thus able to enjoy watching this real-time content. The client 120 inputs instruction information by using the instruction-information interface 124 every time his/her favorite scene is displayed. According to the above-described assist communication system, an incentive is given to the user to receive high-resolution images. Then, the instruction information is transferred from the client 120 to the content distribution server 130, and is stored in the instruction-information storage unit 134.

It is then determined in step S55 whether the client 120 provides an instruction to complete this processing by, for example, finishing the regular processing. If the outcome of step S55 is yes, a completion signal is sent to the content distribution server 130 in step S56. Upon receiving the completion signal, the content distribution server 130 also finishes the regular processing (the result of step S65 is yes), and the overall processing routine is completed.

According to the above-described embodiment, in the content distribution system for providing a time-based event (for example, a sport program or a drama), a digest scene is dynamically created as the content digest information in response to a request from a viewer, and is provided to the corresponding client 120. For example, for the viewers who have watched an event half way through, the digest scene indicating the past progress of the event can be provided. It is thus possible to provide an optimal digest scene according to the time when the viewer has started to watch the event.

Figure 21:
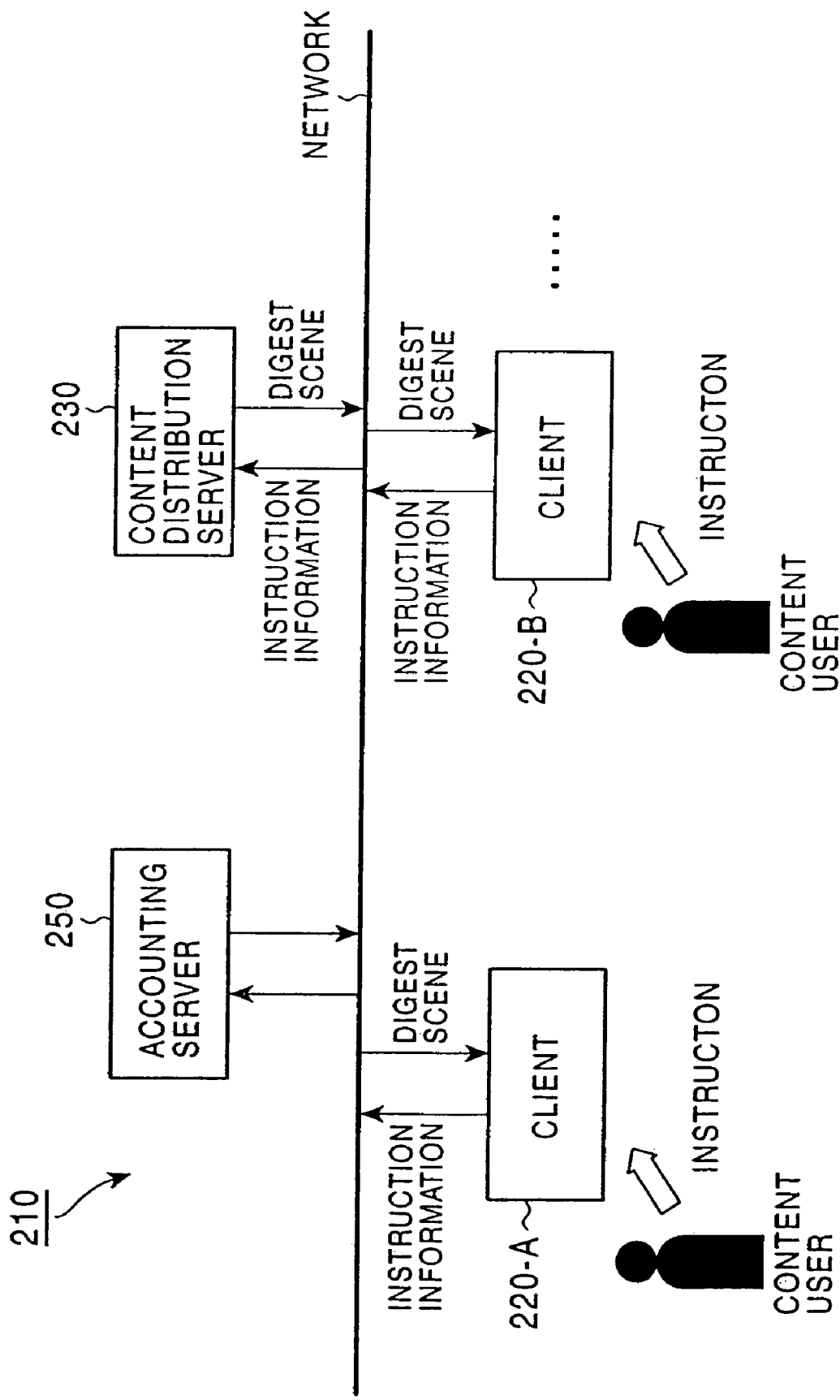
FIG. 21 is a schematic diagram illustrating the configuration of a network system 210 according to still another embodiment of the present invention.

FIG. 21 illustrates the schematic configuration of a network system 210 according to still another embodiment of the present invention. The network system 210 is formed of: as shown in FIG. 21, a content distribution server 230 for distributing the content of a time-based event (for example, a sport program or a drama) and also for creating digest information of the content; at least one client 220A, 220B, and so on (hereinafter referred to as the "client 220" unless it is necessary to distinguish them individually) for receiving and viewing the content; and an accounting server 250 for performing accounting processing on the delivering or the distribution of the digest information. The delivering or the distribution of the content from the content distribution server 230 may be charged to user, or the user may receive it free. The content may be distributed via broadcast waves (not shown) rather than a network.

In this embodiment, the client 220 is provided with a device for specifying a scene that the user wishes to watch, which is described below. Thus, the content distribution server 230 is able to perform statistical processing, for example, averaging the requests of the viewers obtained by the instructions from the users using the above-described device, thereby creating an averaged digest as the content digest information. The content distribution server 230 also creates a personal digest which, reflects the favorite information of the corresponding user, and provides the personal digest to the user as the content digest information. The personal digest can be created from the difference between the favorite information of the corresponding user and the averaged digest.

For example, many pieces of favorite information for the content, such as movies, dramas, or sport programs, are collected from a plurality of viewers and are averaged, thereby creating an averaged digest. This averaged digest may be sold to the viewers who have not watched the corresponding content. According to the difference between the averaged digest and the individual favorite information, a personal digest reflecting more personal favorites can be created. This personal digest may be given back to the viewers who have provided their favorite information. This gives an incentive to the user to receive a personal digest, in which case, the user is motivated to provide his/her favorite information required for creating an averaged digest.

Figure 22:
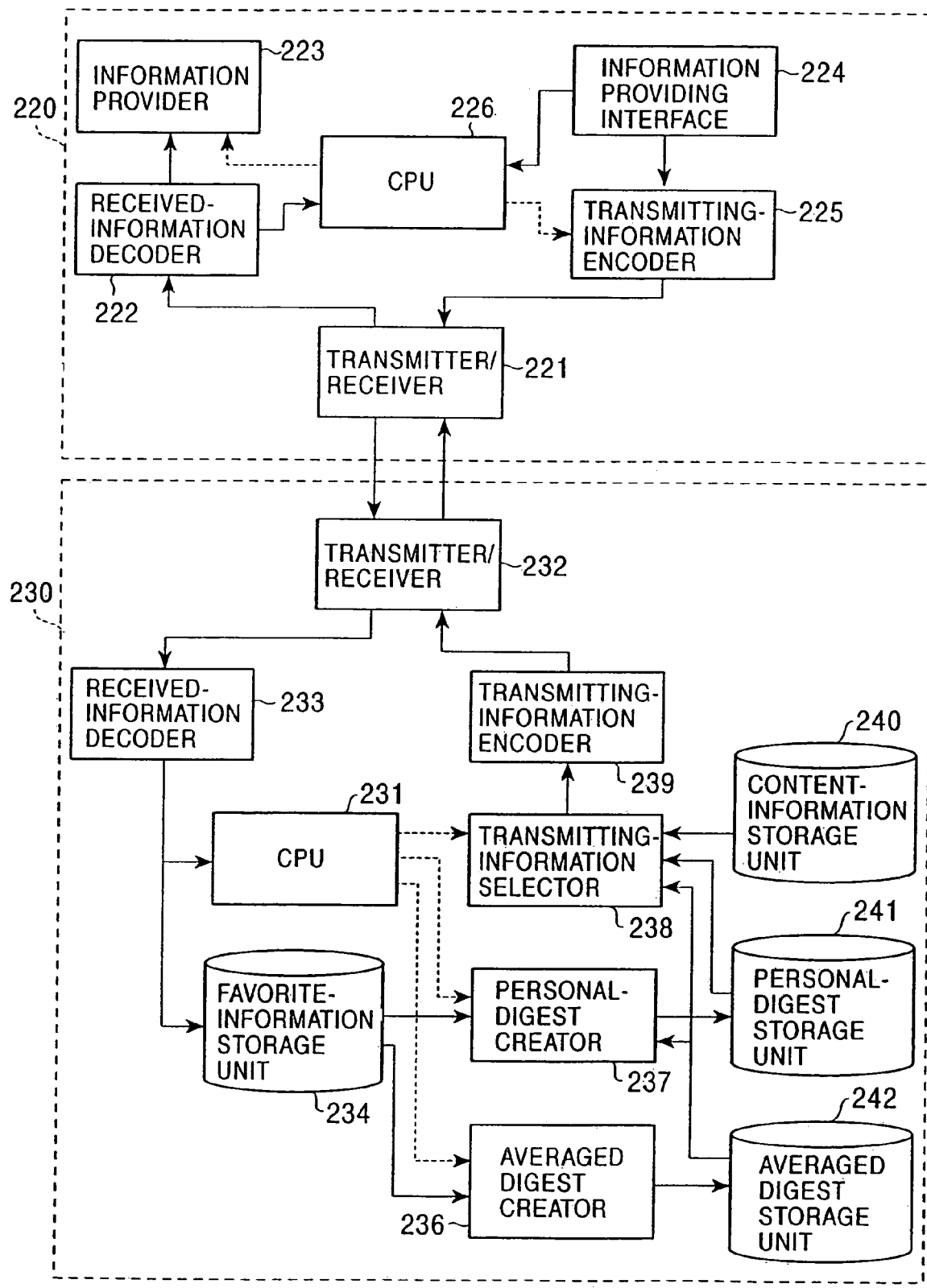
FIG. 22 is a block diagram illustrating the functional configuration of a client 220 and a content distribution server 230 shown in FIG. 21.

FIG. 22 is a block diagram illustrating the functional configuration of the client 220 and the content distribution server 230.

The client 220 includes, as shown in FIG. 22, a transmitter/receiver 221, a received-information decoder 222, an information provider 223, an information providing interface 224, a transmitting-information encoder 225, and a CPU 226. Under the overall control of the CPU 226, the client 220 is able to receive the content and the corresponding digest information, and also performs the corresponding accompanying processing (for example, providing the digest on the information provider 223.

The content of a time-based event sent from the content distribution server 230 is received by the transmitter/receiver 221. The received-information decoder 222 decodes the received data to reproduce the original content, and provides it on the information provider 223.

The information providing interface 224 is formed of a device for enabling the user to input favorite information, such as an interesting scene, an uninteresting scene, a scene that the user wishes to watch, while viewing the content. By using the information providing interface 224, the user is able to spatially or temporally specify the scene. The user favorite information input by the user via the information providing interface 224 can be used as material data for creating the content digest information in the content distribution server 230. The user favorite information is then sent to the transmitting-information encoder 225. The transmitting-information encoder 225 encodes the user favorite information and sends it to the content distribution server 230 by the transmitter/receiver 221.

Only one client 220 is shown in FIG. 22. In practice, however, many clients are connected to the content distribution server 230, and a plurality of pieces of user favorite information are accordingly sent to the content distribution server 230 from the individual clients 220 and are stored in the server 230.

The content distribution server 230 includes a CPU 231, a transmitter/receiver 232, a received-information decoder 233, a favorite-information storage unit 234, an averaged-digest creator 236, a personal-digest creator 237, a transmitting-information selector 238, a transmitting-information encoder 239, a content-information storage unit 240, a personal-digest storage unit 241, and an averaged-digest storage unit 242. Under the overall control of the CPU 231, the content distribution server 230 distributes the content, and also creates and distributes the averaged digest scene or the personal digest scene.

The user favorite information sequentially received by the transmitter/receiver 232 is decoded in the received-information decoder 233, and is stored in the favorite-information storage unit 234.

The content-information storage unit 240 stores information content as the main subject of the distribution services. The information content is, for example, a time-based event, such as a movie, a drama, or a sport program.

The averaged-digest creator 236 extracts the content information from the content-information storage unit 240. It also extracts the favorite information of the individual viewers from the favorite-information storage unit 234, and performs statistical processing, for example, averaging the user favorite information, thereby creating an averaged digest as part of the content digest information. The averaged digest is stored in the averaged-digest storage unit 242. The averaged digest may be sold to the users who have not watched the event. The averaged digest may be formed of a corresponding scene or frame in the content, or may be index information for extracting the corresponding scene or frame from the content.

Since the users' favorites are different, the user favorite information is distributed non-uniformly in the time domain. Accordingly, in this embodiment, the scenes favored by many users are extracted as the averaged digest. For example, the total digest time is determined, and the scenes are extracted in the order of the scenes specified by a greater number of users until the total digest time is reached. It is thus possible to create the averaged digest reflecting many users favorites.

The personal-digest creator 237 extracts the content information from the content-information storage unit 240. It also extracts the favorite information of the individual viewers from the favorite-information storage unit 234 and the averaged digest from the averaged-digest storage unit 242. The personal-digest creator 237 then creates as part of the content digest information a personal digest reflecting the favorites of a specific user from the difference between the favorite information input from the specific user and the averaged digest. The created personal digest is stored in the personal-digest storage unit 241. The personal digest may be sold to the users who have not watched the event. The personal digest may be formed of a corresponding scene or frame in the content, or may be index information for extracting the corresponding scene or frame from the content.

The favorite information provided by each user has portions which overlap with the averaged digest and portions which do not overlap therewith. A personal digest may be created for a specific user by emphasizing the portions unique to the favorite information of the user, which reflects the difference of the favorites between the user and the other users. For example, the total digest time is determined, and the scenes unique to the favorite information of the user and the adjacent scenes are extracted until the total digest time is reached. If all the scenes unique to the user favorite information are extracted before the total digest time is reached, suitable scenes are extracted from the averaged digest, and are filled in the personal digest until the total digest time is reached.

According to the operating mode, the transmitting-information selector 238 selects among the information content from the content-information storage unit 240, the averaged digest from the averaged-digest storage unit 242, and the personal digest from the personal-digest storage unit 241, and outputs the selected-information to the transmitting-information encoder 239.

The selected transmitting information is encoded in the transmitting-information encoder 239, and is then distributed to the client 220 from the transmitter/receiver 232.

The content distribution server 230 may bill for an information usage fee different from the content usage fee when sending the averaged digest or the personal digest. This accounting processing may be performed by the accounting server 250 on the network.

Figure 23:
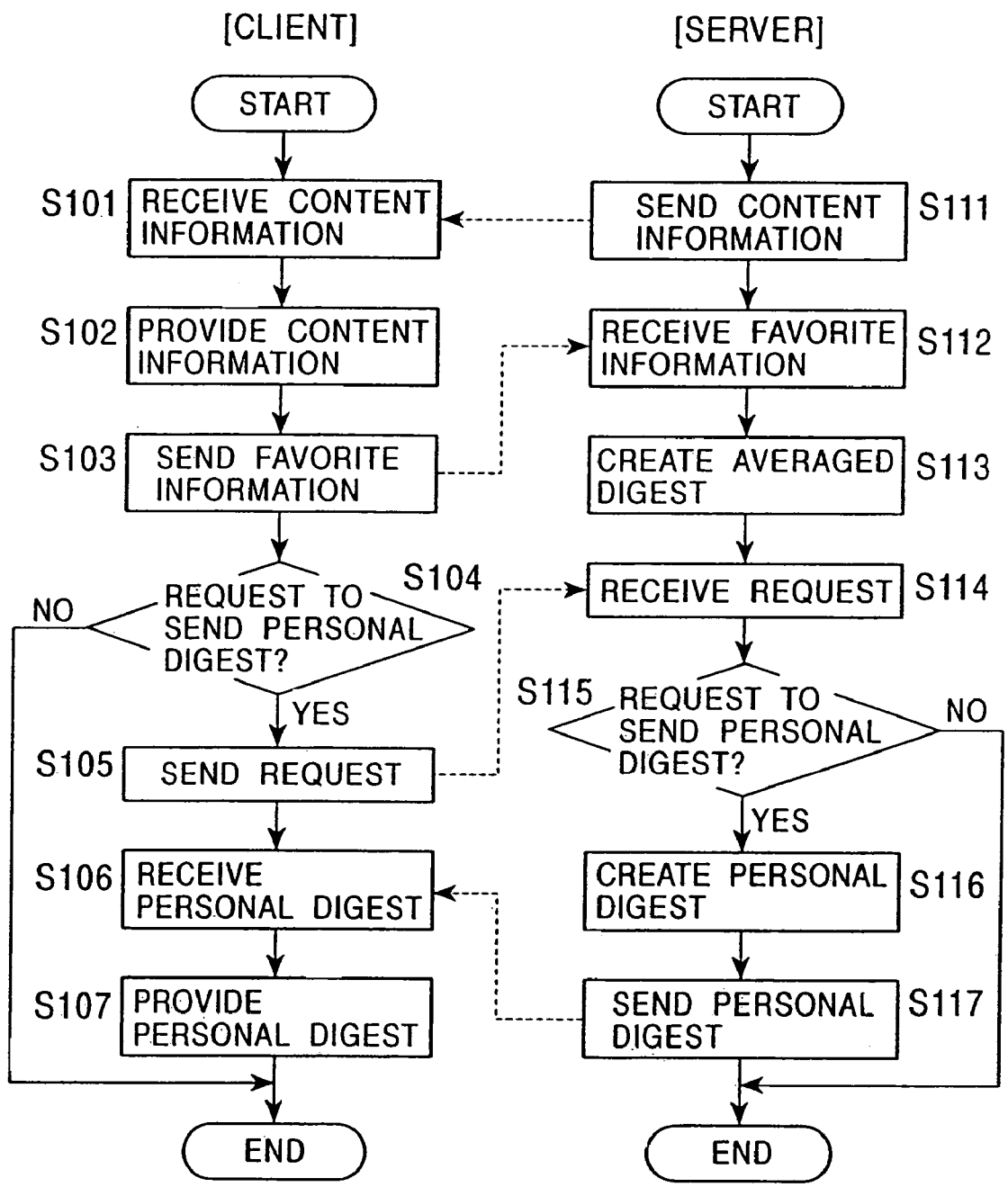
FIG. 23 is a flow chart illustrating the overall processing executed between the client 220 and the content distribution server 230.

FIG. 23 is a flow chart illustrating the processing performed by the client 220 and the content distribution server 230. In practice, this processing is implemented by a cooperative operation of the CPU 226 of the client 220 and the CPU 231 of the content distribution server 230. The overall processing performed by the client 220 and the server 230 is described below with reference to the flow chart of FIG. 23.

In steps S101 and S111, content information is sent and received between the client 220 and the content distribution server 230. More specifically, in the content distribution server 230, in step S111, the content is extracted from the content-information storage unit 240, and is then subjected to predetermined processing in the transmitting-information encoder 239. The content is then transmitted from the transmitter/receiver 232. The content to be distributed is time-based information, such as a movie, a drama, or a sport program. Alternatively, it may be a broadcast program distributed from a predetermined broadcast program.

In the client 220, in step S102, the received content is subjected to predetermined decoding processing in the received-information decoder 222, and is provided on the information provider 223, such as a display unit and a microphone.

While the content is being provided, in step S103, the user of the client 220 inputs user favorite information, such as an interesting scene, an uninteresting scene, or a scene that the user wishes to watch via the information providing interface 224. The input user favorite information is used as material data for generating the content digest information in the content distribution server 230. The user is able to spatially or temporally specify the scene by using the information providing interface 224. The input user favorite information (for example, an interesting scene) is subjected to predetermined encoding processing in the transmitting-information encoder 225, and is then transmitted to the content distribution server 230 via the transmitter/receiver 221.

In the content distribution server 230, in step S112, the user favorite information is received by the transmitter/receiver 232. Then, in step S113, the received favorite information is subjected to predetermined decoding processing in the received-information decoder 233, and is stored in the favorite-information storage unit 234. Then, the averaged-digest creator 236 extracts the favorite information collected from the individual clients from the favorite-information storage unit 234, and performs statistical processing so as to create an averaged digest of the corresponding content stored in the content-information storage unit 240. The created averaged digest is stored in the averaged-digest storage unit 242. Details of the averaged-digest creation processing are described below.

In the client 220, it is determined in step S104 whether the user has made a request to send a personal digest. In step S105, the request is encoded in the transmitting-information encoder 225, and is then sent to the content distribution server 230. When sending the personal digest request, personal user information may be contained in the request.

In step S114, the content distribution server 230 receives the personal digest request. Then, in step S116, a personal digest is created. More specifically, by utilizing the user favorite information stored in the favorite-information storage unit 234 and the averaged digest stored in the averaged-digest storage unit 242, the personal-digest creator 237 creates the personal digest reflecting the favorites of the requested user from the difference between the favorite information input from the requested user and the averaged digest. Details of the personal-digest creation processing are discussed below.

In step S117, the created personal digest is subjected to predetermined encoding processing in the transmitting-information encoder 239, and is then sent to the requested client 220 by the transmitter/receiver 232. The digest may be formed of a combination of the corresponding scenes or frames in the content, or may be index information for extracting these scenes or frames from the content. The content distribution server 230 may bill for an information usage fee different from the content usage fee when sending the personal digest. This accounting processing may be performed by the accounting server 250 on the network.

In the client 220, in step S106, the personal digest is received by the transmitter/receiver 221. Then, in step S107, the personal digest is subjected to predetermined decoding processing in the received-information decoder 222, and is provided on the information provider 223, such as a monitor display unit.

The personal digest reflects more personal favorites than the averaged digest. Accordingly, the user who has received the personal digest is able to more efficiently identify the value or the attraction of the content from a personal point of view. This becomes a strong incentive to the viewers to return the user favorite information, which is used as material data for generating a digest, to the content distribution server 230.

Figure 24:
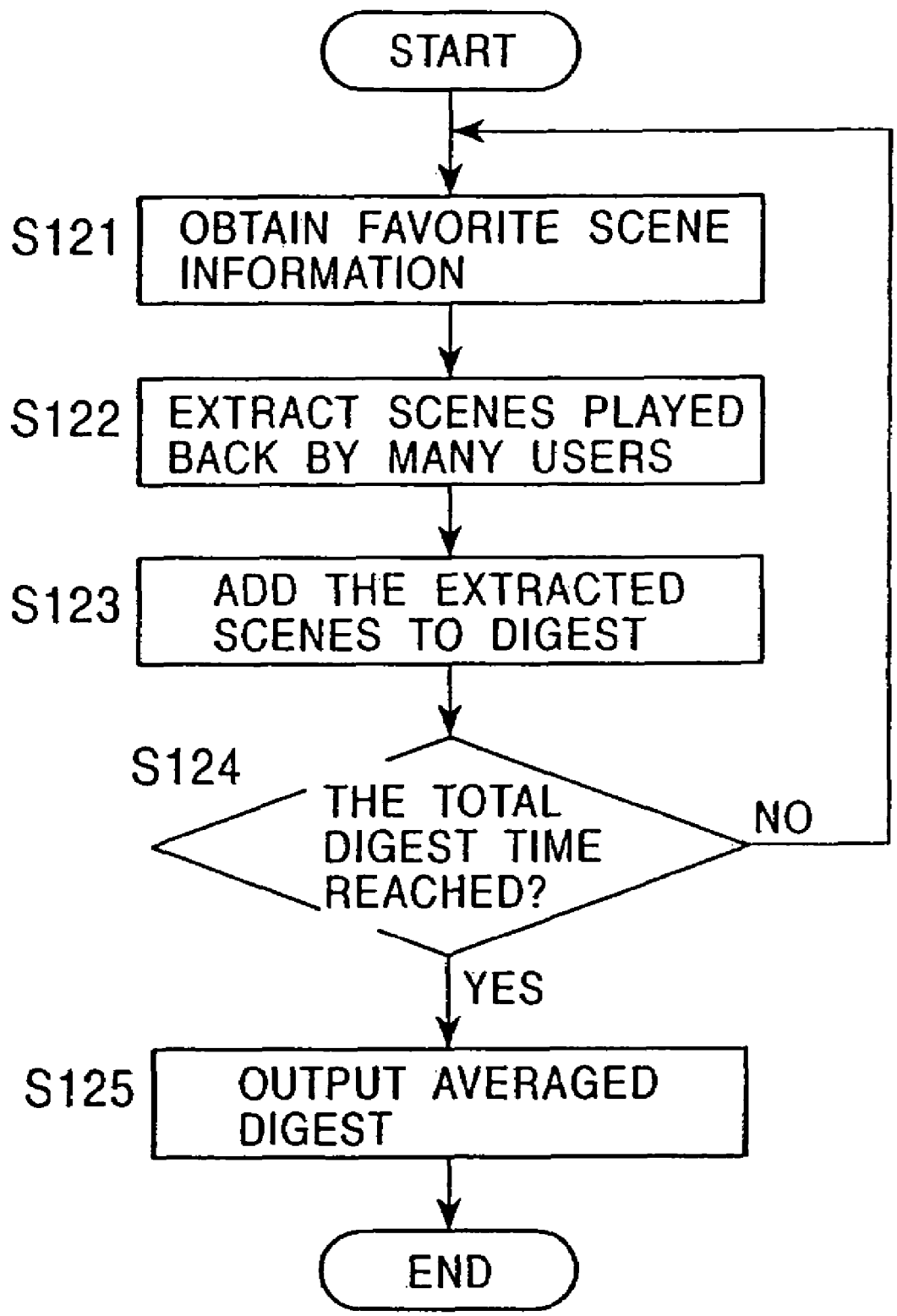
FIG. 24 is a flow chart illustrating the processing for creating an averaged digest by the content distribution server 230.

FIG. 24 is a flow chart illustrating the processing for creating the averaged digest in the content distribution server 230. In practice, this processing is implemented by a cooperative operation of the CPU 231 and the averaged-digest creator 236 of the content distribution server 230. The averaged-digest creation processing is described below with reference to the flow chart of FIG. 24.

The favorite information collected from the individual users, i.e., the clients 220, is stored in the favorite-information storage unit 234. In step S121, the averaged-digest creator 236 extracts the favorite scene information of the individual users from the favorite-information storage unit 234.

The favorite scene information is not uniformly arranged in the time-space domain, but is distributed non-uniformly according to the users' interests. Thus, in step S122, the portions, i.e., the scenes, which are frequency designated in the time-space domain are extracted and combined, thereby forming an averaged digest. More specifically, in step S122, the averaged-digest creator 236 determines the total digest time in advance. Then, the averaged-digest creator 236 sorts the scenes in the order of the scenes which are specified by a greater number of users, and extracts the scenes from the top. In step S123, the extracted scenes are sequentially added as the digest scenes. It is determined in step S124 whether the total digest time has been reached. If the outcome of step S124 is no, the processing in step S123 is repeated until the total digest time has been reached.

If the outcome of step S124 is yes, the process proceeds to step S125 in which the averaged digest is output and stored in the averaged-digest storage unit 242.

Figure 25:
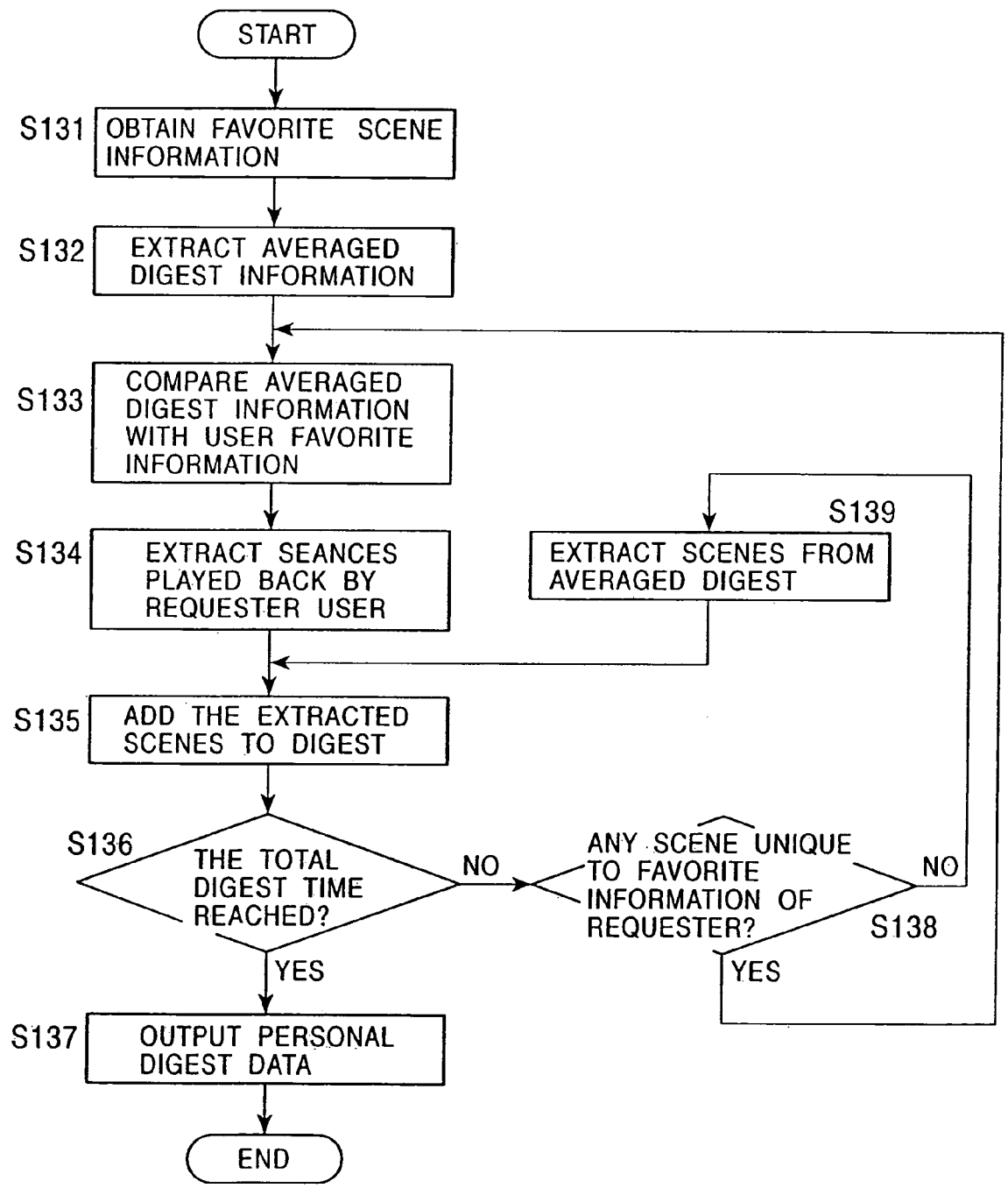
FIG. 25 is a flow chart illustrating the processing for creating a personal digest by the content distribution server 230.

FIG. 25 is a flow chart illustrating the processing for creating a personal digest in the content distribution server 230. In practice, this processing is implemented by a cooperative operation of the CPU 231 and the personal digest creator 237 of the content distribution server 230. The personal-digest creation processing is described below with reference to the flow chart of FIG. 25.

The favorite information collected from the individual users, i.e., the clients 220, is stored in the favorite-information storage unit 234. In step S131, the personal-digest creator 237 extracts favorite scene information of a specific user (who has sent a personal-digest transmission request) from the favorite-information storage unit 234.

Then, in step S132, the personal-digest creator 237 extracts the averaged digest from the averaged-digest storage unit 242.

Then, in step S133, the personal-digest creator 237 compares the favorite information of the requester with the averaged digest. The user favorite information has portions which overlap with the averaged digest and portions which do not overlap therewith according to the individual interests. In step S134, the personal-digest creator 237 extracts the portions unique to the user favorite information, which reflect a difference of favorites between the requester and the other users. Then, in step S135, the extracted portions are added to the personal digest.

It is then determined in step S136 whether the total digest time has been reached. If the result of step S136 is no, the process returns to step S138 in which a determination is made as to whether there are remaining scenes unique to the user favorite information of the requester. If the outcome of step S138 is yes, the process proceeds to step S133 in which the processing in steps S133 through S136 is repeated. If the result of step S138 is no, the process proceeds to step S139 in which scenes are suitably extracted from the averaged digest. Then, in step S135, the extracted scenes are added to the personal digest.

If it is found in step S136 that the total digest time has been reached, in step S137, the personal-digest creator 237 outputs the personal data and is stored in the personal-digest storage unit 241.

According to the above-described embodiment, in the network system 210 for providing information of a time-based event, such as a sport program or a drama, many pieces of favorite information from a plurality of content viewers are collected and averaged, thereby creating an averaged digest as part of the content digest information. This averaged digest may be sold to the users who have not viewed the content. Such users are able to estimate the value and the attraction of the content based on the averaged digest.

In this embodiment, a personal digest reflecting more personal favorites can also be created as part of the content digest information from the difference between the favorite information sent from a specific user and the averaged digest. This personal digest can be provided as a return to the viewers who have provided the favorite information. This can be an incentive to the users to provide favorite information required for generating the averaged digest to the content distribution server 230.

Figure 26:
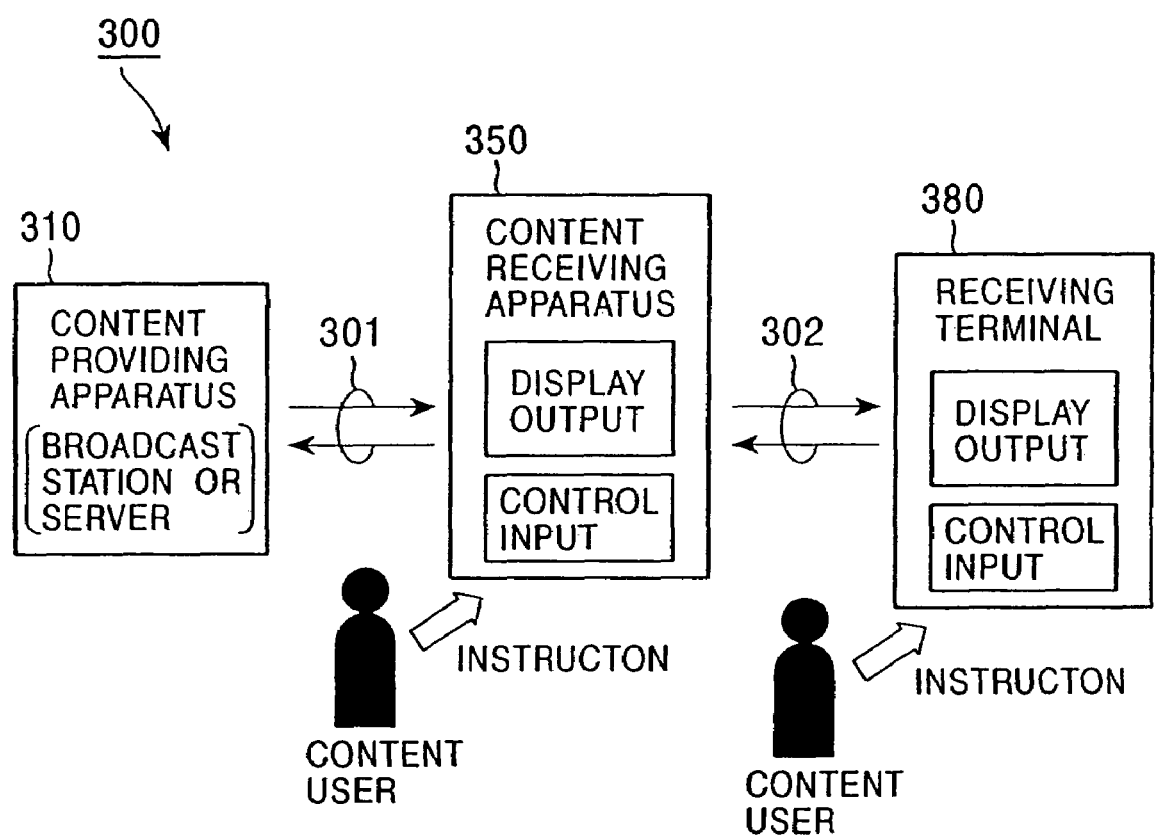
FIG. 26 is a schematic diagram illustrating the configuration of a content distribution system 300 according to a further embodiment of the present invention.

FIG. 26 is a schematic diagram illustrating the configuration of a content distribution system 300 according to a further embodiment of the present invention. The content distribution system 300 includes: as shown in FIG. 26, a content providing apparatus (a broadcast station or a server) 310 for providing content via a predetermined broadcast/communication channel 301; at least one content receiving apparatus 350 for receiving the content from the content providing apparatus 310; and at least one receiving terminal 380 which is connected to the content receiving apparatus 350 via a predetermined broadcast/communication channel 302 and which receives predetermined information from the content receiving apparatus 350.

The content receiving apparatus 350 is formed of, for example, a television receiver or a set-top box (STB). The content receiving apparatus 350 stores the content received from the external content providing apparatus 310, plays back the content by, for example, displaying the content or outputting the sound, and controls the input from a user (for example, play, fast-forward, pause, or rewind). The content receiving apparatus 350 also creates a digest edition of the received content or the stored content, and stores the created digest edition.

In the content receiving apparatus 350, information concerning, for example, the priority and the emergency of the content, may be added to the created digest edition. The data may also be formed into a hierarchical structure consisting of a plurality of data groups having different degrees of digesting. The created and stored digest can be transmitted to the external receiving terminal 380.

The receiving terminal 380 is formed of, for example, a small portable information terminal, such as a personal digital assistant (PDA), or a desk-top or notebook personal computer (PC). The receiving terminal 380 receives the processed data of the content, such as a digest edition, from the content receiving apparatus 350, and displays it on a display unit, such as a viewer, plays it back by, for example, displaying it or outputting the sound, controls the input from a user (for example, play, fast-forward, pause, or rewind).

Figure 27:
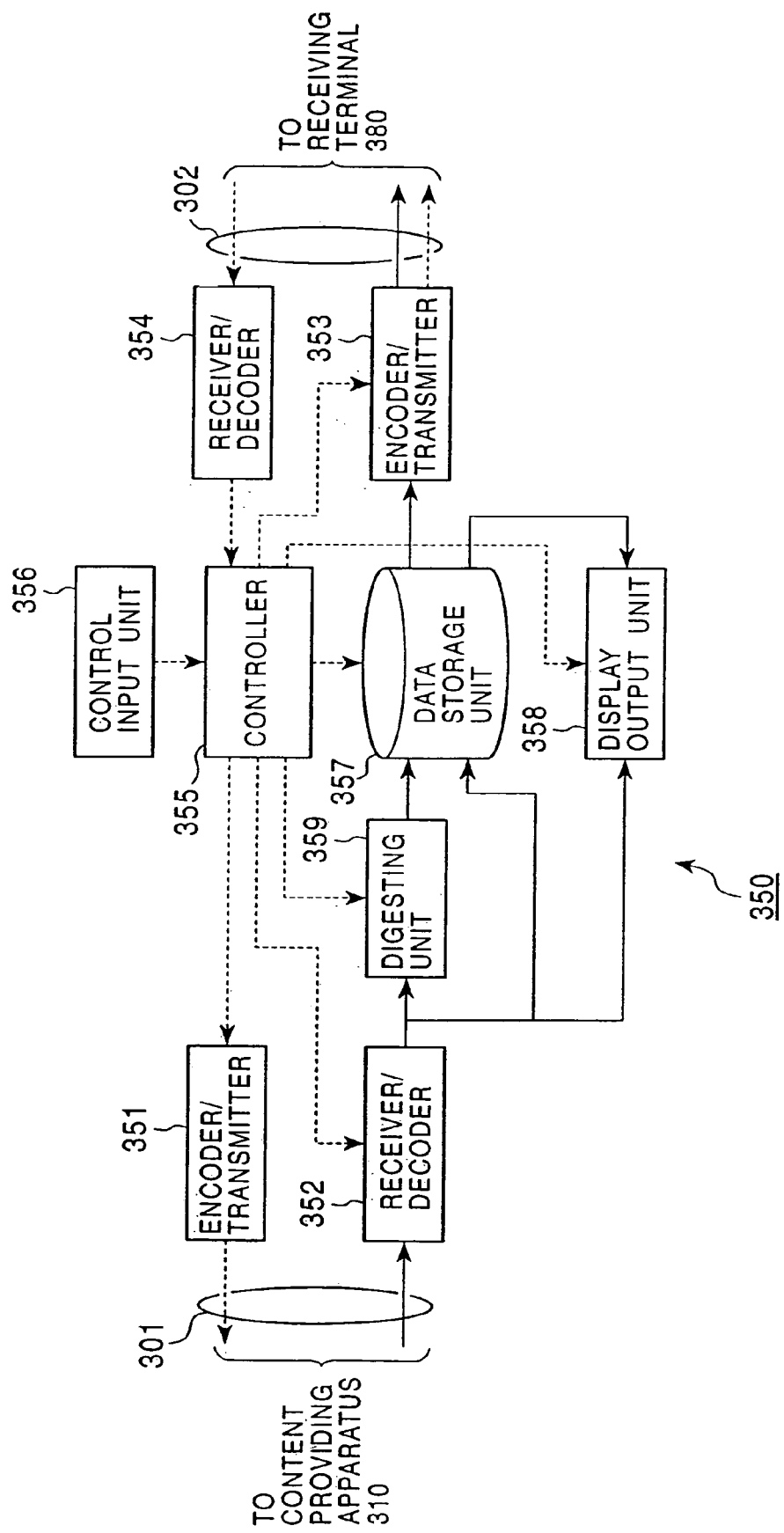
FIG. 27 is a block diagram illustrating the functional configuration of a content receiving apparatus 350 applied to the embodiment shown in FIG. 26.

FIG. 27 is a schematic block diagram illustrating the functional configuration of the content receiving apparatus 350 according to this embodiment. The content receiving apparatus 350 includes, as shown in FIG. 27, an encoder/transmitter 351 for sending data to the content providing apparatus 310, a receiver/decoder 352 for receiving data from the content providing apparatus 310 (interface protocols in the broadcast/communication channel 301 are implemented by the encoder/transmitter 351 and the receiver/decoder 352), an encoder/transmitter 353 for sending data to the receiving terminal 380, a receiver/decoder 354 for receiving data from the receiving terminal 380, a controller 355, a control input unit 356 for receiving user operations, a data storage unit 357, a display output unit 358, and a digesting unit 359.

Under the overall control of the controller 355, the content receiving apparatus 350 digests the content supplied from the content providing apparatus 310, and performs various types of processing, such as providing services for delivering or distributing the created digest to an external terminal. In FIG. 27, the solid arrows indicate the flow of the content and the digest information, while the broken arrows represent the flow of signals for controlling the flow of the above-described data.

The content receiving apparatus 350 is able to request the content providing apparatus 310 to provide the content. In this case, under the overall control of the controller 355, the encoder/transmitter 351 encodes a content transmission request and sends it to the content providing apparatus 310.

The content provided from the content providing apparatus 310 via broadcast or communication means is decoded by the receiver/decoder 352, and is then stored in the data storage unit 357.

The content decoded by the receiver/decoder 352 is also output to the display output unit 358, such as a display device or a microphone, and is provided to the user. Alternatively, the content may be temporarily stored in the data storage unit 357, and may be played back on the display output unit 358.

The content decoded by the receiver/decoder 352 is also output to the digesting unit 359, and a digest edition is created. The digest edition may be any one of a dynamic digest, an averaged digest, and a personal digest described above, and corresponds to the content digest information of the present invention. Details of the digesting processing are described below. The created digest is stored in the data storage unit 357.

The receiving terminal 380, such as a portable device, for example, a PDA, is able to request the content receiving apparatus 350 to send the received content or a digest thereof. This transmission request is received and decoded by the receiver/decoder 354. In this case, under the overall control of the controller 355, the requested content or a digest thereof is extracted from the data storage unit 357, and is encoded by the encoder/transmitter 353, and is then transmitted to the receiving terminal 380. When sending the digest, the content receiving apparatus 350 may bill for an information usage fee different from the content usage fee. This accounting processing may be executed by an accounting server (not shown).

When sending a digesting request to the content receiving apparatus 350, the receiving terminal 380 may attach content processing information (for example, personal user information) which designates the digesting standards or technique. Then, based on the content processing information, the content receiving apparatus 350 may create the digest information of the stored content.

Figure 28:
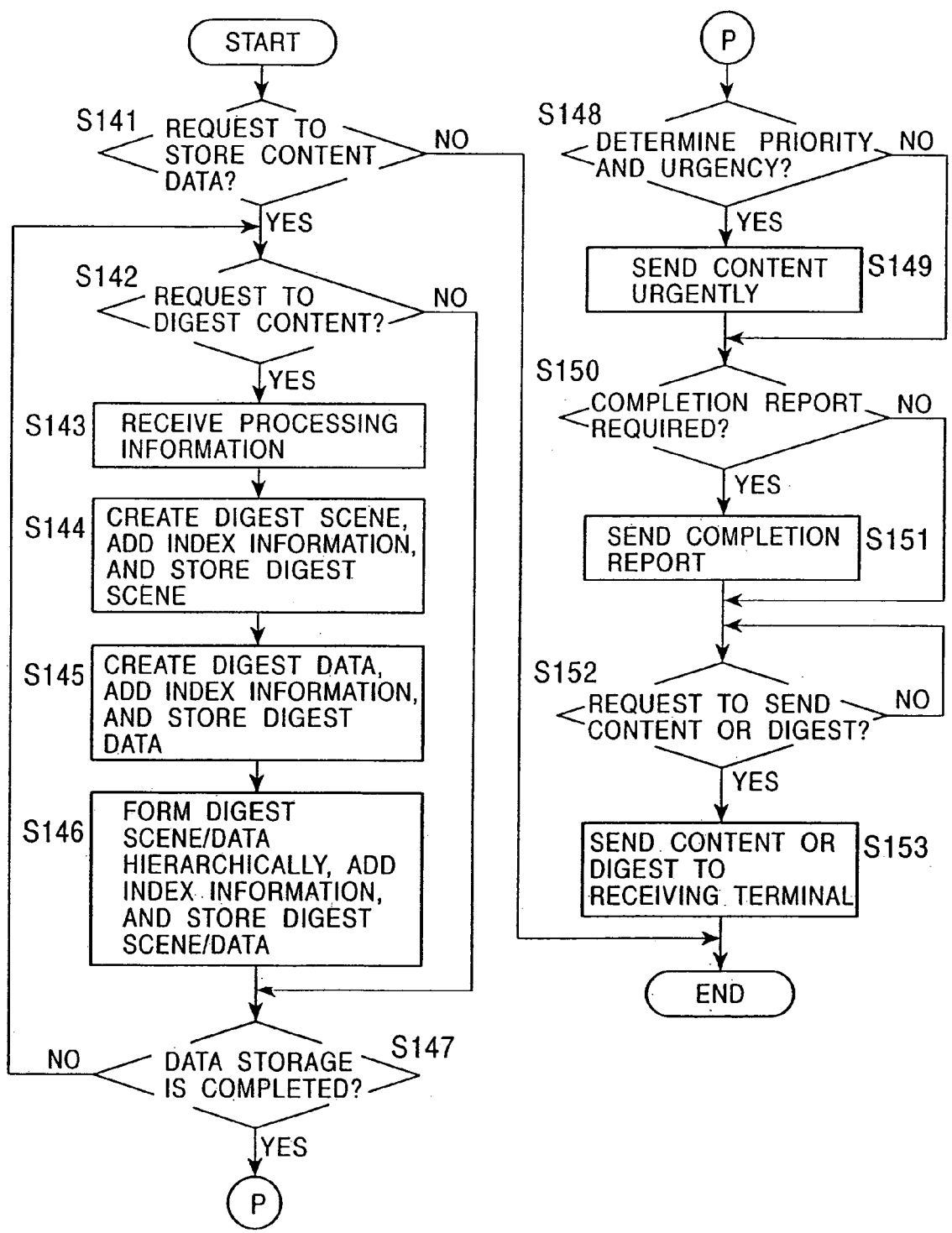
FIG. 28 is a flow chart illustrating content digesting processing executed by the content receiving apparatus 350.

FIG. 28 is a flow chart illustrating the content digesting processing executed by the content receiving apparatus 350. In practice, this processing is implemented by executing a predetermined program code by the controller 355. The content digesting processing is discussed below with reference to the flow chart of FIG. 28.

The content is distributed from the content providing apparatus 310 to the content receiving apparatus 350 via the broadcast/communication channel 301. It is first determined in step S141 whether there is a request to store content data. If the outcome of step S141 is yes, the controller 355 determines in step S142 whether there is a request to digest the content from the receiving terminal 380.

If the result of step S142 is yes, in step S143, the processing information required for digesting the content is received from the receiving terminal 380. Then, in step S144, an image-based digest scene is created by the digesting unit 359, and index information is added to the image-based digest scene and is stored in the data storage unit 357. In step S145, the digesting unit 359 also creates text-based digest data, and index information is added to the text-based digest data and is stored in the data storage unit 357.

In step S146, the digesting unit 359 forms the digest scene/data into a hierarchical structure according to, for example, the frequency of occurrence of requests, and attaches the index information to the hierarchical digest scene/data. The resulting digest scene/data is then stored in the data storage unit 357. The digesting degree is different according to the level of the hierarchical structure. In this embodiment, a higher level of the hierarchical structure has a smaller amount of data, i.e., a smaller data size.

It is then determined in step S147 whether the data storage is completed. If the outcome of step S147 is yes, the content digesting processing is completed. If the result of step S147 is no, the process returns to step S142, and the corresponding processing is repeated.

Then, in step S148, the priority and the urgency of the content are determined by the controller 355. If it is found in step S148 that the content has a high priority or urgency, in step S149, the content is urgently transmitted under the control of the controller 355.

Then, it is determined in step S150 whether it is necessary to send a completion report. If the outcome of step S150 is yes, in step S151, a completion report is sent.

A determination is then made in step S152 as to whether a transmission request has been made from the receiving terminal 380. If the result of step S152 is yes, in step S153, the requested content or a digest thereof is sent to the receiving terminal 380.

The transmission services of the content or the digest may be charged to the receiving terminal 380. In this case, the accounting processing may be performed by an accounting server (not shown). The content receiving apparatus 350 may automatically select the digest data of a suitable level according to the accounting status of the user or the transmission rate of the broadcast/communication channel 302, and transfers the selected digest data to the receiving terminal 380.

Upon receiving the content or a digest thereof, the receiving terminal 380 is now able to play back the content or the digest. If the receiving terminal 380 has a limited storage capacity or computation performance, such as a small terminal device, for example, a PDA, it can obtain a relatively small digest edition so as to display it under mobile environments.

The content digest processing according to this embodiment is discussed below by using a baseball broadcast program as an example of the content.

It is now assumed that an instruction to store the content of a baseball broadcast program has been provided from the content receiving apparatus 350 or the receiving terminal 380, and that an instruction to digest the content is simultaneously provided.

When a baseball broadcast time is started, the content receiving apparatus 350 starts to store the broadcast program. If there is a scene in which a score is obtained, the corresponding scene is automatically extracted and stored separately from the main baseball broadcast edition. Alternatively, an interview of a user's favorite team is stored. Not only the video data, but also data of a score-book indicating the progress of a game, and the results or the progress of other games are extracted and stored. Additionally, auxiliary data related to the main broadcast program (for example, an electronic program guide (EPG)) may be extracted and stored.

The broadcast data itself is positioned at the lowest level having the highest amount of information of the hierarchical structure. The scoring scene is positioned at a higher level having a smaller amount of information. Among the scoring scenes, a home-run scene or a scoring scene of a user's favorite team is positioned at a higher level having a smaller amount of information. Compared to the score-book, scenes related to a hitter, a runner, a pitcher, or a score extracted from the score-book is positioned at a higher level. Information concerning a final score, a winner/loser pitcher, or a hitter who has hit a home-run may be positioned at an even higher level having a smaller amount of information. For facilitating the search, which is to be executed later, index information is attached to the data of the individual levels, and the resulting data is stored in the data storage unit 357.

Upon completing the broadcast of the program, the data storage processing for the broadcast content is also finished. The content may urgently be transmitted to the receiving terminal 380 only when a user's favorite team has won, in which case, only the results of the game may be sent. A storage completion report may also be sent to the receiving terminal 380.

Thereafter, when the user has time while being away or on the way home, the user requests the receiving apparatus 350 to send the information of the progress of the game by using the receiving terminal 380, such as a PDA. The receiving apparatus 350 then sends the data at a higher level having a relatively smaller amount of information, such as a home-run scene or a game progress list, according to the traffic of the communication channel. Then, after going home, the user is able to enjoy the entire baseball broadcast program or favorite scenes by using the content receiving apparatus 350.

The above-described content distribution processing and the value-added information creation processing of the foregoing embodiments of the present invention may be implemented by a special hardware device. Alternatively, such processing may be implemented by executing predetermined software programs (for example, program codes indicated by the flow charts of FIGS. 3, 4, 8, 9, 10, 16, 17, 20, 23, 24, 25, and 28) by using a general-purpose computer system.

Figure 29:
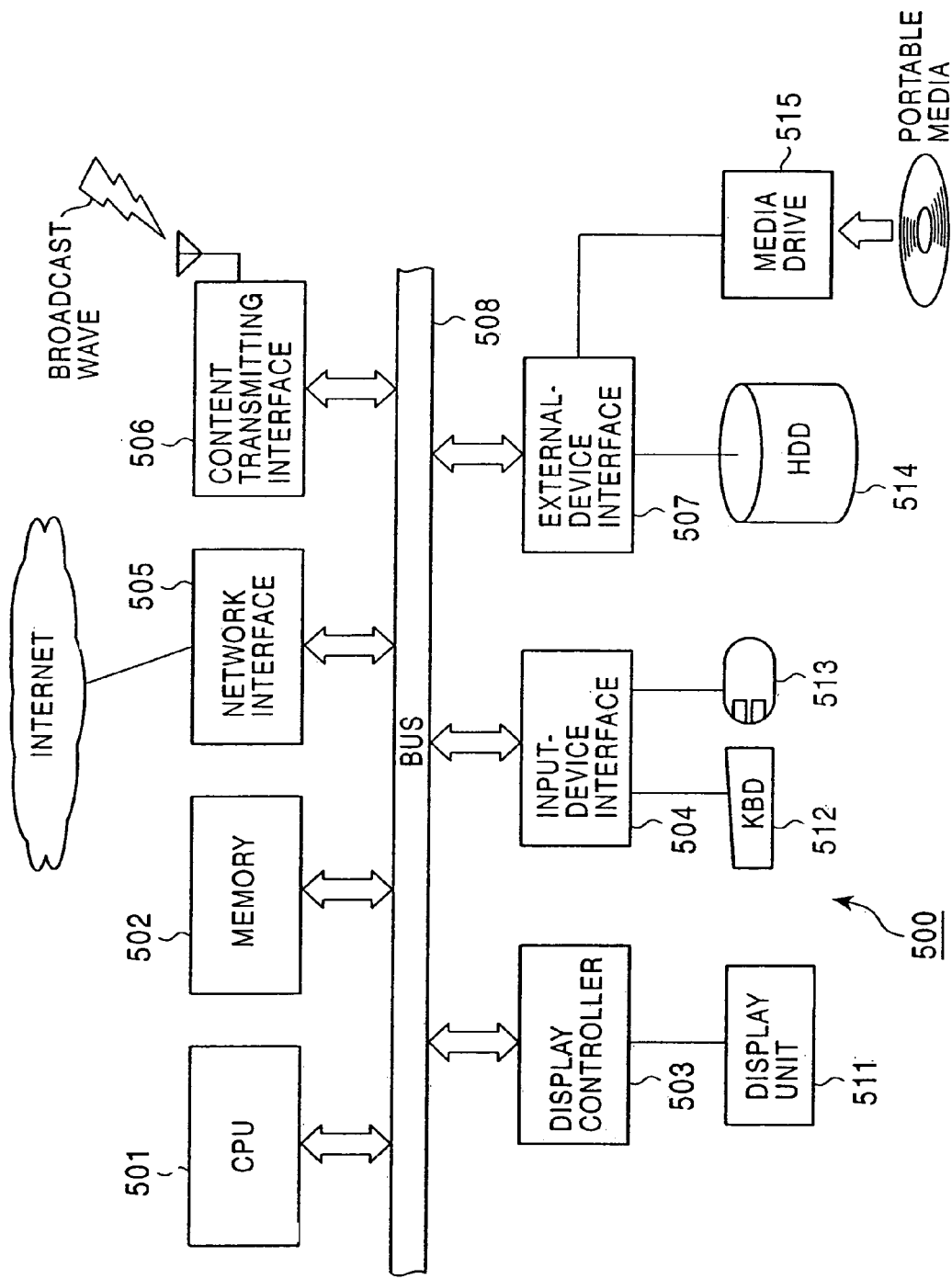
FIG. 29 is a schematic block diagram illustrating the configuration of a computer system 500 for performing content distribution processing and value-added information creation processing.

FIG. 29 is a schematic block diagram illustrating the configuration of a computer system 500 to which the present invention is applied. A description is given below, with reference to FIG. 29, of the functional configuration of the computer system 500 for executing the program codes indicated by the flow charts of FIGS. 3, 4, 8, 9, 10, 16, 17, 20, 23, 24, 25, and 28.

A CPU 501, which serves as a main controller of the computer system 500, runs various applications under the control of an operating system (OS). As shown in FIG. 29, the CPU 501 is connected to the other devices (described below) via a bus 508.

A memory 502 stores program codes executed by the CPU 501, and temporarily stores work data which is being executed. It is to be understood that the memory 502 includes non-volatile and volatile memory devices.

A display controller 503 is a special controller for processing rendering commands issued by the CPU 501. The rendering data processed by the display-controller 503 is temporarily written into, for example, a frame buffer (not shown), and is output to a display unit 511.

An input-device interface 504 is a device for connecting a user input device, such as, a keyboard 512 or a mouse 513, to the computer system 500.

A network interface 505 is able to connect the computer system 500 to a local network, such as a LAN, or a wide network, such as the Internet, according to a predetermined communication protocol, such as the Ethernet.

On the network, a plurality of host terminals (not shown), such as content receiving apparatuses, are connected to each other while being transparent to each other, thereby constructing a distributed computing environment. Software programs and data content can be distributed on the network. For example, application programs for performing the content distribution processing and the content digest information creation processing according to the foregoing embodiments of the present invention can be downloaded via the network. It is also possible to receive user favorite information and instruction information input by using the individual content receiving apparatuses on the network, and to distribute the content value-added information and the content digest, which are generated based on the favorite information and the instruction information, to the content receiving apparatuses via the network.

A content transmitting interface 506 is a device for transmitting the content by superimposing it on broadcast waves of a predetermined channel. However, if the content is distributed via a network or a medium, such as a DVD, it is not necessary to use the content transmitting interface 506.

An external-device interface 507 is a device for connecting an external device, such as a hard disk drive (HDD) 514 or a media drive 515, to the computer system 500.

The HDD 514 is a known device in which a magnetic disk, which serves as a storage carrier, is fixed, and exhibits superior characteristics than the other external storage devices in light of the storage capacity and the transfer rate. To place a software program on the HDD 514 so that it can be executed is to "install" the program into the system. Generally, program codes of the OS executed by the CPU 501, application programs, and device drivers are stored in the HDD 514. These data are retained even if the computer system 500 is powered off.

For example, applications for performing the content distribution processing and the content value-added information/digest information creation processing according to the above-described embodiments of the present invention can be installed in the HDD 514. The distribution content and the user favorite information/instruction information received via a network can be stored in the HDD 514. The content value-added information/digest information generated based on the user favorite information/instruction information can also be stored in the HDD 514.

The media drive 515 is a device for loading a portable medium, such as a compact disc (CD), a magneto-optical disk (MO), or a DVD, thereon, so as to access the data recording surface of such a portable medium.

The portable media are used for backing up software programs and data files in the computer readable format, and are also used for transferring such programs and files between systems (i.e. sales, distribution, and delivering of the programs and files). For example, applications for the content distribution processing and the value-added information/digest information creation processing can be physically distributed or transferred among a plurality of devices by using these portable devices. The content value-added information and the digest information generated based on the user favorite information and instruction information can be physically distributed or transferred among a plurality of devices by using these portable devices.

An example of the computer system 500 shown in FIG. 29 is a PC/AT (personal computer/advanced technology) compatible machine (IBM Corporation in the United States) or a succeeding model thereof. Alternatively, a computer based on another architecture may be used as the computer system 500.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:
    a receiver for receiving plural sets of operation data obtained by a plurality of users for dynamic data played back by playback apparatuses;
    a storage device for storing the plural sets of operation data received by said receiver;
    a generator for generating digest information of the dynamic data according to the plural sets of operation data stored in said storage device; and
    a transmitter for transmitting the digest information generated by said generator to at least one playback apparatus,
    wherein said receiver receives playback-portion identification information indicating a playback portion of the dynamic data played back by the playback apparatus,
    wherein said generator comprises a statistical processor for accumulating playback times of the playback portion based on the playback-portion identification information received by said receiver, and generates the digest information based on an accumulation result obtained by said statistical processor, and wherein the generated digest information is stored in classified databases corresponding to titles, personal information, and playback-time zones.

2. A communication apparatus according to claim 1, wherein said receiver receives the plural sets of operation data indicating instructions to fast-forward, rewind, or pause the dynamic data played back by the playback apparatus.

3. A communication apparatus according to claim 1, wherein said generator generates the digest information from the playback portion whose accumulated playback times indicate a predetermined threshold or greater.

4. A communication apparatus according to claim 1, wherein said generator generates the digest information from the portions other than the playback portion whose accumulated playback times indicate a predetermined threshold or smaller.

5. A communication apparatus according to claim 1, wherein said receiver receives, together with the plural sets of operation data, title information, playback time information, or user attribute information of the dynamic data played back by the playback apparatus.

6. A communication apparatus according to claim 5, wherein:
said storage device stores the operation data of a plurality of users corresponding to the title information;
said statistical processor accumulates the playback times of the playback portion according to the title information based on the operation data of the plurality of users;
said generator generates the digest information based on the accumulation result; and
said transmitter transmits the digest information to the playback apparatus for playing back the title information.

7. A communication apparatus according to claim 6, wherein the user attribute information includes age, gender, or life-style, and said generator generates the digest information according to the user attribute information.

8. A communication apparatus according to claim 1, wherein said receiver receives as the operation data time-space position data designating a time-space position of the dynamic data played back by the playback apparatus.

9. A communication apparatus according to claim 8, wherein:
said storage device stores a plurality of the dynamic data; and
said transmitter encodes the dynamic data and transmits the encoded dynamic data to the playback apparatus in response to a request from a respective user, in which said transmitter encodes a target area designated by the time-space position data at a first resolution level, and encodes areas other than the target area at a second resolution level which is lower than the first resolution level.

10. A communication apparatus according to claim 1, wherein:
said transmitter transmits predetermined dynamic data to the playback apparatus in response to a request from a respective user;
said receiver receives the operation data obtained by each user for the dynamic data transmitted by said transmitter;
said generator generates the digest information of the dynamic data according to the operation data; and
said transmitter transmits the generated digest information to the corresponding playback apparatus in response to a request from the user.

11. A communication apparatus according to claim 10, wherein said transmitter comprises a broadcaster for broadcasting the dynamic data to the playback apparatuses of unspecified users.

12. A communication apparatus according to claim 10, wherein said receiver receives as the operation data time-space position data designating a time-space position of the dynamic data transmitted by said transmitter and played back by the playback apparatus.

13. A communication apparatus according to claim 12, wherein said transmitter encodes the dynamic data and transmits the encoded dynamic data to the playback apparatus in response to a request from the user, in which said transmitter encodes a target area designated by the time-space position data at a first resolution level, and encodes areas other than the target area at a second resolution level which is lower than the first resolution level, and transmits the encoded dynamic data.

14. A communication apparatus according to claim 13, wherein said generator comprises a statistical processor for accumulating designation times of each of the time-space positions based on the time-space position data of the identical dynamic data received from a plurality of users by said receiver, and generates the digest information based on an accumulation result obtained by said statistical processor.

15. A communication apparatus according to claim 14, wherein said generator dynamically sorts the accumulation results of scenes designated by the time-space position data obtained by said statistical processor in descending numeric order, and extracts a predetermined number of scenes having a greater number of the accumulated designation times according to a sorting result, thereby dynamically generating the digest information.

16. A communication apparatus according to claim 15, wherein:
said transmitter comprises a broadcaster for broadcasting the dynamic data to the playback apparatuses of unspecified users;
such that when said receiver receives request information to send the digest information from the playback apparatus while the dynamic data is being broadcast, said generator generates the digest information during a period from when the dynamic data is started until when the digest information is transmitted; and
said transmitter transmits the digest information to the playback apparatus.

17. A communication apparatus according to claim 15, wherein:
when said receiver receives request information to send the digest information from a specific playback apparatus, said generator compares the generated digest information based on the sorting result with the scenes designated by the time-space position data of the user of the specific playback apparatus, and preferentially selects the scenes unique to the time-space position data of the user, thereby generating new digest information for the user.

18. A communication apparatus according to claim 1, wherein said transmitter transmits the digest information to the playback apparatus of a respective user, and also transmits accounting information including payment information for billing the user to an external settlement center.

19. A communication apparatus comprising:
a receiver for receiving dynamic data from an external source;
a reproducer for playing back the dynamic data received by said receiver;
an input for inputting as input data user favorite data for the dynamic data played back by said reproducer;
a generator for generating digest information based on the input data input by said input; and
a transmitter for transmitting the digest information generated by said digest-information generating means to a portable terminal,
wherein said input outputs as the input data playback-portion identification information indicating a playback portion of the dynamic data played back by said reproducer,
wherein said generator comprises a statistical processor for accumulating playback times of the playback portion based on the playback-portion identification information, and generates the digest information based on an accumulation result obtained by said statistical processor, and
wherein the generated digest information is stored in classified databases corresponding to titles, personal information, and playback-time zones.

20. A communication apparatus according to claim 19, wherein said input outputs input data indicating instructions to fast-forward, rewind, or pause the dynamic data played back by said reproducer.

21. A communication apparatus according to claim 19, wherein said generator generates the digest information from the playback portion whose accumulated playback times indicate a predetermined threshold or greater.

22. A communication apparatus according to claim 19, wherein said generator generates the digest information from portions other than the playback portion whose accumulated playback times indicate a predetermined threshold or smaller.

23. A communication apparatus according to claim 19, wherein said input outputs as the input data title information, playback time information, or user attribute information of the dynamic data played back by said reproducer.

24. A communication apparatus according to claim 23, further comprising:
a storage device for storing plural sets of operation data of a plurality of users corresponding to the title information, wherein:
said statistical processor accumulates the playback times of each of the playback portions according to the title information based on the plural sets of operation data of the plurality of users; and
said generator generates the digest information based on the accumulation result.

25. A communication apparatus according to claim 24, wherein the user attribute information includes age, gender, or life-style, and said digest-information generating means generates the digest information according to said user attribute information.

26. A communication apparatus according to claim 19, wherein said input outputs as the input data time-space position data designating a time-space position of the dynamic data played back said reproducer.

27. A communication apparatus according to claim 19, wherein:
said transmitter transmits a request to send predetermined dynamic data to an external communication apparatus;
said receiver receives the dynamic data transmitted from said external communication apparatus in response to the request; and
said generator generates the digest information of the dynamic data.

28. A communication apparatus according to claim 19, wherein said receiver comprises a broadcast receiver for receiving the dynamic data to be broadcast to the reproducer of unspecified users.

29. A communication apparatus according to claim 28, wherein said input outputs as the input data time-space position data designating a time-space position of the dynamic data received by said broadcast receiver and played back by said reproducer.

30. A communication apparatus according to claim 29, wherein said generator comprises a statistical processor for accumulating designation times of each of the time-space positions based on the time-space position data of the identical dynamic data input by said input, and generates the digest information based on an accumulation result obtained by said statistical processor.

31. A communication apparatus according to claim 30, wherein said generator dynamically sorts the accumulation results of scenes designated by the time-space position data obtained by said statistical processor in descending numeric order, and extracts a predetermined number of scenes having a greater number of the accumulated designation times according to a sorting result, thereby dynamically generating the digest information.

32. A communication apparatus according to claim 31, wherein, when said input outputs request information to send the digest information from said reproducer while the dynamic data is being broadcast, said generator generates the digest information during a period from when the dynamic data is started until when the digest information is transmitted.

33. A communication apparatus according to claim 31, wherein, when said input outputs request information to send the digest information from a specific user, said generator compares the digest information generated based on the sorting result with the scenes designated by the time-space position data of the specific user, and preferentially selects the scenes unique to the time-space position data of the specific user, thereby generating new digest information for the specific user.

34. A communication apparatus according to claim 19, wherein said transmitter preferentially transmits the digest information to said external source according to priority level or urgency level of the digest information.

35. A communication apparatus according to claim 19, wherein said generator generates the digest information in a hierarchical structure consisting of layers having different sizes of the digest information, in which a lower layer of the hierarchical structure has a greater size of the digest information, and a higher layer of the hierarchical structure has a smaller size of the digest information.

36. A communication apparatus according to claim 35, wherein said generator selectively transmits the digest information of the individual levels of the hierarchical structure according to traffic of a communication channel between said communication apparatus and said external source.

37. A communication apparatus according to claim 19, wherein said reproducer comprises a display for displaying moving picture data, which serves as the dynamic data or the digest information.

38. A communication method comprising the steps of:
receiving plural sets of operation data obtained by a plurality of users for dynamic data played back by playback apparatuses and playback-portion identification information indicating a playback portion of the dynamic data played back by the playback apparatus;
accumulating playback times of the playback portion based on the playback-portion identification information received by said receiving step,
generating digest information of the dynamic data according to the plural sets of received operation data;
storing the generated digest information in classified databases corresponding to titles, personal information, and playback-time zones; and
transmitting the generated digest information to at least one playback apparatus,
wherein said generating step generates the digest information based on an accumulation result obtained by said accumulating step.

* * * * *